United States Patent Office 3,823,167
Patented July 9, 1974

3,823,167
PIGMENT DYESTUFFS
Karl-Heinz Peters, Cologne-Buchheim, and Rütger Neeff, Leverkusen, Germany, assignors to Bayer Aktiengesellschaft, Leverkusen, Germany
No Drawing. Original application June 25, 1969, Ser. No. 836,634, now Patent No. 3,699,126. Divided and this application June 29, 1971, Ser. No. 158,066
Claims priority, application Germany, June 26, 1968, P 17 68 745.5, P 17 68 755.7, P 17 68 756.8
Int. Cl. C09b 1/42
U.S. Cl. 260—372
2 Claims

ABSTRACT OF THE DISCLOSURE

Dyestuffs of the formulae

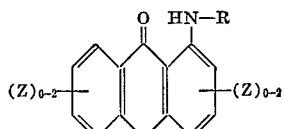

(I)

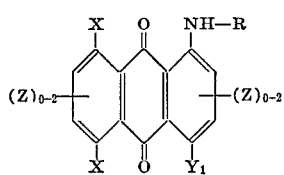

(II)

or

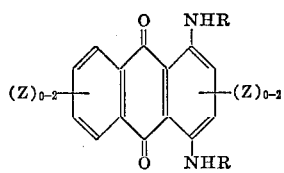

(III)

wherein Z is a substituent, one X is a member NHR and the other is hydrogen or a substituent Z, Y is an optionally substituted hydrocarbon residue or an acyl group, $Y_1$ is hydrogen or a substituent, and R is a moiety CO—B—CO—NH—E where B is a bond, saturated or unsaturated alkylene with or without hetero atoms and substituents, mono or polynuclear arylene with or without substituents, cycloalkylene with or without substituents or heteroarylene with or without substituents and E is a radical B or an aralkyl group; as well as their preparation and use as pigments; the novel dyestuffs are pigment dyestuffs and free of sulfonic acid and carboxylic acid groups.

This application is a division of copending application, Ser. No. 836,634, filed June 25, 1969, now U.S. Pat. 3,699,126.

The dyestuffs according to this invention comprise anthraquinones with a novel moiety NHR which is further defined as CO—B—CO—NH—E. Preferred groups of dyestuffs of the general formulae (I), (II), and (III) are those which are free of sulfonic acid and carboxylic acid groups. In the novel moiety R, i.e. CO—B—CO—NH—E, B is preferably an arylene radical especially a phenylene radical which may contain substituents such as those listed below. E is an alkyl, a heteroaryl or an aryl radical especially phenyl which may contain the below listed substituents.

The subject matter of the present invention comprises dyestuffs of the formula

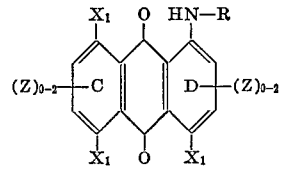

wherein Z is a substituent preferably selected from the group comprising hydrogen; halogen such as chlorine, fluorine or bromine; alkyl, preferably $C_1$–$C_{16}$ alkyl; nitro; amino; hydroxy; cyano; carboxy; alkoxy, preferably containing 1 to 3 carbon atoms; aryloxy, preferably phenyloxy, $C_{1-16}$ alkyl mercapto, aryl mercapto such as phenyl mercapto; aryl, especially phenyl or naphthyl; $C_{1-18}$ alkyl carbonyl amino such as acetyl amino, valeryl amino and stearoyl amino; aryl carbonyl amino such as naphthoyl and benzoyl amino; aryl sulfonyl amino, such as benzene sulfamide and $C_{1-18}$ alkyl sulfonyl amino; carbamoyl; aryl sulfonyl such as phenyl sulfonyl; $C_{1-6}$ alkyl sulfonyl; carboxy alkyl esters wherein the alkyl members contain 1 to 5 carbon atoms; carboxy aryl esters especially phenyl esters; sulfonic acid aryl esters, such as sulfonic acid phenyl esters; sulfonic acid alkyl esters with 1–6 carbon atoms; carbalkoxy with 1–5 carbon atoms; carbaryloxy especially naphthyl or phenyl carbonyl; arylamino especially anilino; alkylamino with 1 to 17 carbon atoms; alkenylamino with 1 to 17 carbon atoms; cycloalkylamino, preferably cyclohexyl amino; aralkylamino especially benzyl or phenyl ethyl amino; wherein the above-mentioned cyclic radicals can contain 0 to 4 substituents per ring selected from the group consisting of chlorine, fluorine, bromine, nitro, hydroxy, alkoxy, with 1 to 6 carbons, trihaloalkyl with 1–6 carbon atoms such as trifluoromethyl; alkyl carbonylamino with 1–6 carbon atoms such as acetyl amino, alkyl containing 1 to 6 carbon atoms, sulfamoyl and cyano; $X_1$ stands for a member Z or NHR wherein when one $X_1$ is NHR, the others are Z; R stands for the grouping —CO—B—CO—NH—E wherein B is selected from the group consisting of a single bond; saturated alkylene with 1 to 17 carbon atoms which can contain in the alkylene chain hetero atoms selected from the group consisting of O, S and NH and further including the members

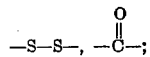

substituted alkylene and hetero-substituted alkylene chains wherein the substituents may be selected from the group consisting of hydroxy, alkyl carbonyl amino with 1–6 carbons such as acetyl amino alkoxy with 1–6 carbon atoms and carboxy; unsaturated alkylene with 1 to 17 carbon atoms which may contain the same hetero atoms and substituents mentioned for the saturated alkylene chain; mono-nuclear arylene preferably phenylene; polynuclear arylenes such as naphthylene, biphenylene, azo benzene, azoxybenzene, hydrazobenzene, benzophenone, azo biphenyl, diphenyl methane, diphenyl ether, terphenyl, biphenyl azo biphenyl; cycloalkylene such as cyclohexyl, cyclopentyl and bicycloheptene; hetero arylene containing 5 or 6 members which may contain hetero members selected from the group consisting of oxygen, sulfur, and nitrogen, especially furanyl, thiophenyl and pyridinyl wherein the above cyclic members can contain 0–4 substituents per ring, selected from the group consisting of halogen such as chlorine, fluorine and bromine, alkyl with 1–6 carbon atoms, hydroxy, alkoxy with 1 to 6 carbon atoms, alkyl carbonyl amino, such as acetyl amino, nitro. The member E is selected from the group consisting of saturated alkyl with 1 to 18 carbon atoms which may contain hetero atoms selected from the group consisting of O, S and NH further including the members

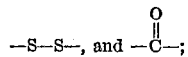

substituted saturated $C_{1-18}$ alkyl with or without hetero atoms with substituents selected from the group consisting of hydroxy, alkoxy with 1 to 6 carbon atoms, carboxy, and alkyl carbonyl amino with 1-6 carbons such as acetyl amino; unsaturated alkyl with 1 to 18 carbon atoms which may contain hetero atoms and/or substituents as defined for the saturated alkyl members; cyclo alkyl with up to 9 carbon atoms, especialy cyclohexyl and cycloalkyl which may further contain 1 or more hetero atoms selected from the group consisting of nitrogen, oxygen, and sulfur, especially sulfur cyclopentyl S, S dioxide; aralkyl, preferably benzyl but including phenyl ethyl and including hexahydrobenzyl; mono or polycycloaryl such as phenyl, naphthyl, anthracenyl, pyrenyl, diphenyl, tetrahydronaphthylene, chrysene and preferably phenyl; hetero aryl members contain preferably O, S, or N hetero atoms especially benzofuranyl, pyridinyl, carbazolyl, pyrimidinyl, triazolyl, benzotriazolyl, thiazolyl, benzothiazolyl, piperazinyl, furanyl and thiophenyl; or cycloalkylene sulfones with up to 9 members per ring; where the cyclic members listed above can contain 0-4 substituents per ring selected from the group consisting of halogen such as chlorine, bromine, fluorine, nitro, alkyl with 1 to 12 carbon atoms, hydroxy alkyl with 1 to 12 carbon atoms, cyclo alkyl such as cyclohexyl, trihalo alkyl such as trifluoromethyl, hydroxy, alkoxy with 1 to 3 carbon atoms, aryloxy such as phenoxy, carboxy alkyl carbonylamino such as acetylamino, cyano, arylamino especially phenylamino which may contain further substituents such as methyl and methoxy, alkyl sulfonyl with 1 to 6 carbon atoms, aryl sulfonyl such as phenyl sulfonyl, alkyl carbonyl with 1 to 6 carbon atoms, aryl carbonyl such as phenyl carbonyl, carboxy alkyl esters with 1 to 6 carbon atoms, sulfamoyl, which can contain as N-substituents tolyl, hydroxy alkyl with 1 to 6 carbons such as hydroxy ethyl or phenyl radicals; alkyl or aryl sulfonyl amino especially phenyl or methyl sulfonyl amino; carbonamide, phenyl azo or phenyl azoxy which may contain carbonamide substituents.

One preferred class of dyestuffs of formula (I) is

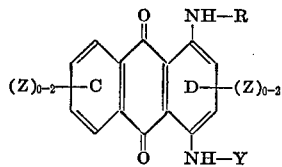

in which Y denotes $C_{1-18}$ alkyl carbonyl, aryl carbonyl, aryl sulfonyl; $C_{1-18}$ alkyl sulfonyl, aryl $C_{1-17}$ alkyl, $C_{1-17}$ alkenyl, cycloalkyl, aralkyl wherein the aryl radicals can contain 0-4 substituents per ring selected from the group consisting of Cl, F, Br, $NO_2$, OH, $CF_3$, $COCH_3$, CN, $SO_2NH_2$, alkyl with 1 to 6 carbon atoms and alkoxy with 1 to 6 carbon atoms.

Another preferred class is

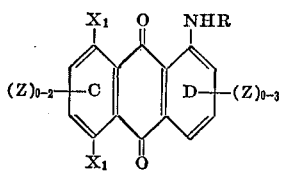

Still another preferred class is

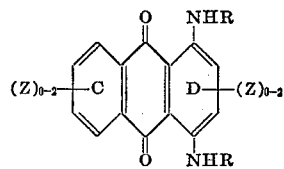

The compounds according to this invention are prepared according to known processes, for example, by acylating anthraquinone derivatives of the formula

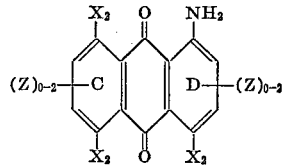

(II)

in which one of the $X_2$'s can be an amino and the others are selected from the definitions given above for $X_1$ and Z is as defined above. These compounds (II) are reacted with reactive derivatives, preferably the halides, anhydrides or alkyl esters of dicarboxylic acid of the general formula COOH—B—COOH in which B is defined as above with at least one mole of the said reactive derivatives being used for every free amino group in (II) and by subsequent reaction with an amine of the general formula $NH_2E$ in which E is as defined above by using at least one mole of the amine for every group $NH_2$ of (II) which is to be converted into a radical NHR. Since the first preferred group of dyestuffs of this invention are those containing two radicals NHR the preparation according to this first process involves two moles of acid and two moles of amine for each mole of anthraquinone (II) utilized. In another preferred process a single NHR radical is desired, thereby requiring only one mole of acid and amine.

The compounds can also be prepared by known methods involving the acylation of anthraquinone derivatives of the formula (II) with at least one mole per free $NH_2$ group of a reactive derivative of an N-substituted dicarboxylic acid monoamide of the formula

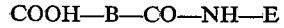
COOH—B—CO—NH—E in which B and E are defined as above. Suitable reactive derivatives are especially the halides and alkyl esters.

More specifically, the compounds according to the invention can be preferably prepared, for example, by reacting an amine of the formula (II) with an excess of a dicarboxylic acid halide of the formula

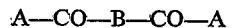
A—CO—B—CO—A in which B is defined as above and A is fluorine, chlorine, or bromine, at a temperature between 40° and 220° C. in an organic solvent such as benzene, toluene, xylene, chlorobenzene, dichlorobenzene, trichlorobenzene, nitrobenzene, and optionally in the presence of basic catalysts such as pyridine, piperidine, morpholine, trimethylamine, collidine, picoline, lutidine, quinoline, with or without the addition of acid binding agents such as sodium carbonate, potassium carbonate, sodium or potassium bicarbonate or quick lime until the starting amine is completely converted and subsequently reacting the resulting compound of the formula

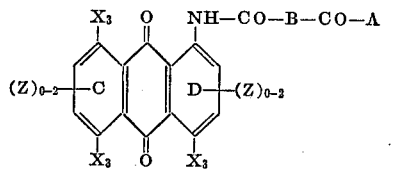

(III)

in which B is an defined above, and one of the additional substituent $X_3$ can be a radical NH—CO—B—CO—A with the others being as defined above for $X_2$ after separation from the reaction solution or without isolation with an excess of an amine of the formula $NH_2E$ at temperatures between 40° and 220° C. with the use of the amine as solvent or the use of an organic solvent such as benzene, toluene, xylene, chlorobenzene, dichlorobenzene, trichlorobenzene, nitrobenzene, optionally in the presence of basic catalysts such as pyridine, piperidine, morpholine, trimethylamine, collidine, picoline, lutidine, quinoline, with or without the addition of acid binding agents such as sodium carbonate, potassium carbonate, sodium or potassium bicarbonate or quick lime.

Examples of amino atnhraquinones (II) preferably used for the preparation of the compounds (I) according to the invention are:

4-amino-1-methylamino anthraquinone,
4-amino-1-hexahydroanilino anthraquinone,
4-amino-1-acetylamino anthraquinone,
4-amino-1-chloroacetylamino anthraquinone,
4-amino-1-butylamino anthraquinone,
4-amino-1-stearoylamino anthraquinone,
4-amino-1-benzylamino anthraquinone,
4-amino-1-(2,3- or 4-chlorobenzoylamino)-anthraquinone,
4-amino-1-(2,4- or 2,5-dichlorobenzoylamino)-anthraquinone,
4-amino-1-(2,3- or 4-nitrobenzoylamino)-anthraquinone,
4-amino-1-(4-chloro-3-nitrobenzoylamino)-anthraquinone,
4-amino-1-(3,5-dinitrobenzoylamino)-anthraquinone,
4-amino-1-(3- or 4-trifluoromethylbenzoylamino)-anthraquinone,
4-amino-1-(4-methylbenzoylamino)-anthraquinone,
4-amino-1-(4-methoxybenzoylamino)-anthraquinone,
4-amino-1-(3-sulfamoylbenzoylamino)-anthraquinone,
4-amino-3-methyl-1-(4-chlorobenzoylamino)-anthraquinone,
4-amino-5-nitro-1-benzoylamino-anthraquinone,
4-amino-3-bromo-1-(para toluenesulfamido)-anthraquinone,
4-amino-1-anilino anthraquinone,
4-amino-1-(4-methoxyanilino)-anthraquinone,
4-amino-3-bromo-1-(4-methylanilino)-anthraquinone,
4-amino-3-bromo-1-(2,6-diethyl-4-methylanilino)-anthraquinone,
4-amino-1-(2- or 4-bromobenzoylamino)-anthraquinone,
1,4-diamino-anthraquinone,
2-bromo-1,4-diamino-anthraquinone,
2,3-dichloro-1,4-diamino-anthraquinone,
5,8-dichloro-1,4-diamino-anthraquinone,
2-nitro-1,4-diamino-anthraquinone,
5-nitro-1,4-diamino-anthraquinone,
2-bromo-5-nitro-1,4-diamino-anthraquinone,
5-benzoylamino-1,4-diamino-anthraquinone,
5-acetylamino-1,4-diamino-anthraquinone,
1,4-diamino-5,8-dihydroxy-anthraquinone,
1,4-diamino-2-phenoxy-anthraquinone,
1,4-diamino-2,3-diphenoxy-anthraquinone,
1,4-diamino-5,8-dihydroxy-2-phenylmercapto-anthraquinone,
6-bromo-1,4-diamino-5,8-dihydroxy-2-phenylmercapto-anthraquinone,
1,4-diamino-2-phenylsulphonyl-anthraquinone,
5-nitro-1,4-diamino-2-(4-chloro-phenylsulphonyl)-anthraquinone,
1,4-diamino-anthraquinone-2-sulphonic acid-phenyl ester,
1,4-diamino-2-(4-methoxy-phenyl)-3-cyano-anthraquinone,
1,4-diamino-anthraquinone-3'-carboxylic acid amide, ethyl ester, and
butyl ester.

Further examples of amino-anthraquinone of the formula (II) preferably used for the preparation of the compounds according to the invention are:

1,5- and 1,8-diamino-anthraquinone,
1,4,5,8-tetramino-anthraquinone,
4-chloro-1,5-diamino-anthraquinone,
2,4,6,8,-tetrabromo-1,5-diamino-anthraquinone,
3-chloro-4,8-diamino-1,5-bis-(4-methyl-anilino)-anthraquinone,
4,5-diamino-1-benzoylamino-anthraquinone,
4,8-diamino-1-hydroxy-anthraquinone,
4,8-diamino-1,5-dihydroxy-anthraquinone,
4,5-diamino-1,8-dihydroxy-anthraquinone,
4,5,8-triamino-1-hydroxy-anthraquinone,
4,8-diamino-1,5-dimethoxy-anthraquinone,
2,6-dibromo-1,5-diamino-4,8-dihydroxy-anthraquinone;

the mixture obtained when 4,8-diamino-1,5-dihydroxy- or 4,5-diamino-1,8-dihydroxy-anthraquinone is brominated e.g. in sulphuric acid and which contains about one bromine atom per mole of
4,8-diamino-1,5-dihydroxy- or 4,5-diamino-1,8-dihydroxy-anthraquinone,
3-bromo-1,4,8-triamino-5-hydroxy-anthraquinone,
2-bromo-4,5,8-triamino-1-hydroxy-anthraquinone, or
2-(4,-methoxyphenyl)-1,5-diamino-4,8-dihydroxy-anthraquinone.

The reactive derivatives of the dicarboxylic acids preferably include the halides especially the fluorides, chlorides, and bromines as well as the esters and anhydrides, particularly the alkyl esters and especially the methyl or ethyl esters. Aliphatic dicarboxylic acids may be used such as oxalic, malonic, succinic, glutaric, adipic suberic azelaic, sebacic; aliphatic dicarboxylic acids containing hetero atoms such as diglycolic acid, thio diglycolic acid, methylene-bis-thioglycolic acid, di-thio-diglycolic acid, imino-diacetic acid; substituted aliphatic dicarboxylic acids such as, heptadecane-dicarboxylic acid-(1,8) or -(1,9), hydroxy-succinic acid, acetone-dicarboxylic acid, acetylamino-succinic acid, 2-acetylamino-glutaric acid; cycloaliphatic dicarboxylic acids, such as cyclohexane-dicarboxylic acid-(1,2) or -(1,4), campheric acid; bicyclic dicarboxylic acids, such as bicyclo[2,2,1]-heptene-(5)-dicarboxylic acid-(2,3); unsaturated dicarboxylic acids, such as fumaric acid, 1,2,3,6-tetrahydrophthalic acid; mononuclear arylene-dicarboxylic acids, such as benzene-dicarboxylic acid-(1,2), -(1,3) or -(1,4), 4-chloro-isophthalic acid, 5-nitro-isophthalic acid, 2-chloro-terephthalic acid, 2-nitro-terephthalic acid, 2,5-dichloro-terephthalic acid, 4-hydroxy-isophthalic acid, 2,5-dimethoxy-terephthalic acid, 2,5-difluoro-terephthalic acid, tetrachloro or tetrafluoro-terephthalic acid; polynuclear condensed arylene-dicarboxylic acids, such as naphthalene-dicarboxylic acid-(1,4)-, -(1,5) or -(2,6); polynuclear annellated arylene-dicarboxylic acids, such as diphenyl-dicarboxylic accid-(4,4'),
diphenyl-sulphone-dicarboxylic acid-(4,4'),
azobenzene-dicarboxylic acid-(4,4'),
azoxybenzene-dicarboxylic acid-(4,4'),
hydrazobenzene-dicarboxylic acid-(4,4'),
benzophenone-dicarboxylic acid-(2,4),
diphenylether-dicarboxylic acid-(4,4'),
diphenylmethane-dicarboxylic acid-(4,4'),
p-terphenyl-dicarboxylic acid-(4,4'),
4'-carboxy-biphenyl-4-azo-4-biphenyl-carboxylic acid-(4'), or
hetero-arylene-dicarboxylic acids such as 2,5-furan-dicarboxylic acid,
2,5-thiophene-dicarboxylic acid,
pyridine-dicarboxylic acid-(2,3), -(2,4),
-(2,5) or -(2,6).

Example of amines of the formula NH₂E serving for the preparation of the compounds used according to the invention are:

aliphatic amines such as methylamine, ethylamine, propylamine, n-, iso- and tert.-butylamine, dodecyl-, tetradecyl- or hexadecylamine, 9-amino-heptadecane, stearylamine; substituted aliphatic amines, such as 2-amino- or 1-amino-ethanol, 3-amino-propanol, amino-acetic acid, 6-amino-hexanic acid; amino-alkanes with chain-positioned hetero atom, such as 2-(2-amino-ethyl-amino)-ethanol - (1), 3 - methoxypropylamine, 3 - ethoxy-propylamine, 3 - butyloxy - propylamine, 3-(2-ethyl-hexyloxy)-propylamine, 2-amino-diethyl sulphide; alkenyl-amines, such as allylamine; cycloalkyl-amines, such as cyclohexylamine, 2-(2-hydroxy-ethyl)-cyclohexylamine, 2-, 3- or 4-methyl-cyclohexylamine, hexahydro-benzylamine; cycloalkyl-amines with interrupting hetero atoms in the alkylene chain, such as 3-amino-sulpholane, N-(2-aminoethyl)-piperazine; aralkyl-amines, such as benzylamine, 1-amino-1- or -2-phenyl-ethane, ω-amino-acetophenone; optionally substituted aryl-amines with optionally annellated or condensed aryl nuclei, such as aniline, 2-, 3- or 4-chloro-aniline, 2,3-, 2,4-, 2,5-, 3,4- or 3,5-dichloroaniline, 2,4,5-trichloroaniline, 2-, 3- or 4-nitroaniline, 4-chloro-2-nitro-aniline, 5-chloro-2-nitro-aniline, 3-chloro-4 - nitro - aniline, 2,5-dichloro-4-nitro-aniline, 2,4-dinitroaniline, 6 - bromo - 2,4-dinitro-aniline, 2-, 3- or 4-aminotoluene, 2-, 3- or 4-amino-benzotrifluoride, 4-chloro-2-amino-toluene, 5-chloro-2-amino-benzotribuoride, 4,5-dichloro-2-amino-toluene, 4-, 5- or 6-nitro-2-amino-toluene, 4-chloro-3-amino-toluene or -benzo-trifluoride, 2-ethylaniline, xylidines, 5-amino-1,3-bistrifluoromethyl-benzene, 2 - amino-1,3,5-trimethyl-benzene, 4-amino-1-methyl-3,5-diethyl-benzene, 4-amino-1,3-dimethyl-5-ethylbenzene, 4-dodecyl-aniline, 5,6,7,8-tetrahydro-naphthylamine-(1), or -(2), 4-amino-1-cyclohexylbenzene, 1- or 2-amino-naphthalene, 2-amino-anthracene, 1-amino-pyrene, 6-aminochrysene, 2- or 4-amino-diphenylamine, 4-amino-4'-methyl-diphenylamine, 3-amino-4-methyl-diphenylamine, 2-, 3- or 4-amino-diphenyl ether, 2-, 3- or 4-amino-1-methoxy-benzene, 4-chloro-5-nitro-2-amino-1-methoxy-benzene, 4'-amino - 4 - methoxy-diphenylamine, (2-hydroxyethyl)-(4-amino - phenyl) - sulphone, methyl - (4-amino-phenyl)-sulphone, 4 - amino - 3-methoxy-diphenyl-amine, 4-amino-1,3 - dimethoxy - benzene, 6-chloro-4-amino-1,3-dimethoxy-benzene, 2-amino-1,4-diethoxy-benzene, 3-amino-4-methoxy - diphenylsulphone, 4 - amino - acetophenone, 4-amino-benzophenone, 2-, 3- or 4-amino-benzamide, 4-amino-benzoic acid-methyl or -ethyl ester, 3-nitro-4-amino-benzamide, 4 - chloro - 2 - amino-benzonitrile, 4-amino-isophthalic acid dintrile, 4-amino-isophthalic acid diamide, 6-amino-naphthoic acid amide(2), 3- or 4-aminobenzene-sulphonic acid amide, 3-amino-benzene-sulphonic acid-(2-hydroxyethyl)-amide, 4-amino-benzene-sulphonic acid anilide, 2-amino-benzoic acid-sulphonic acid-(4)-diamide, 4-amino-azobenzene, 4-amino-azobenzene-carbonamide-(4'); or hetero-aromatic amines such as 3- or 2-amino-dibenzofuran, 2-amino-pyridine, 2-aminomethylpyridine, 3 - ethyl - 3-amino-carbazole, 2-amino-4-methylpyrimidine, 3 - amino - 1,2,4 - triazole, 5-amino-2-phenylbenzotriazole, 2-amino-thiazole, 2-amino-benzo-thiazole, 6-amino-2-methyl-benzothiazole, or 6-methoxy-2-aminobenzothiazole.

The dyestuffs so prepared are obtained in a form suitable for pigments, or they can be brought into a fine division by a known after-treatment, in order to be converted into a form suitable for pigments, for example, by dissolving or swelling them in strong inorganic acids such as sulphuric acid and pouring the mixture on to ice. The fine division can also be achieved by grinding with or without grinding auxiliaries, such as inorganic salts or sand, optionally in the presence of solvents such as toluene, xylene, dichlorobenzene or N-methyl-pyrrolidone. The strength of colour and the transparency of the pigments can be influenced by varying the after-treatment.

The pigments used according to the invention can be used for the production of very fast pigmented systems, such as mixtures wtih other substances, preparations, coating agents, printing colours, coloured paper and coloured macro-molecular materials. The term "mixture with other substances" comprises, for example, mixtures with inorganic white pigments such as titanium dioxide (rutile) or with cement. Preparations are, for example, flush pastes with organic liquids, or pastes and fine pastes with water, dispersing agents and possibly preservatives. The term "coating agent" stands, for example, for physically or oxidatively drying lacquers, stoving lacquers, reaction lacquers, two-component lacquers, disperse by dyestuffs for weather-fast coatings and size colours. The printing colours comprise those for paper, textile and metal sheet printing. The macromolecular substances can be of natural origin, such as caoutchour, or they can be obtained by chemical modification, such as acetyl cellulose, cellulose butyrate or viscose, or they can be synthetically produced, such as polymers, polyaddition products and polycondensates. Examples are plastic masses such as polyvinyl chloride, polyvinyl acetate, polyvinyl propionate; polyolefines, e.g. polyethylene or polypropylene; polyesters, e.g. polyethylene terephthalate; polyamides, superpolyamides, polymers and copolymers from acrylic esters, methacrylic esters, acrylonitrile, acrylamide, butadiene, styrene; as well as polyurethanes and polycarbonates. The substances pigmented with the claimed products may be present in any form.

The compounds used according to the invention have excellent pigment properties and are not only eminently fast to wet processing, oil, acid, lime, alkali, solvent, overcoating, overspraying, sublimation and stable to heat and vulcanisation, but they also give very good yields, they can easily be dispersed in plastic materials and have outstanding fastness to light and weather.

The parts given in the Examples are parts by weight.

EXAMPLE 1

(a) 8 parts 4-(4-chloro-benzoylamino)-1-[4-(3-chloro-phenylcarbamoyl)-benzoylamino] - anthraquinone which have been finely divided by grinding in a vibrator mill with 2 parts xylene and 160 parts sodium chloride and washing out the sodium chloride, are ground with a stoving lacquer obtained from 25 parts coconut oil alkyd resin (40% coconut oil), 10 parts melamine resin, 50 parts toluene and 7 parts glycol monomethyl ether in an automatic Hoover-Muller grinding machine. The mixture is applied to the substrate to be coated, the lacquer is cured by stoving at 130° C., and there are obtained violet lacquer coats of good covering power and of very good fastness to overcoating and outstanding fastness to light and weather.

(a-I) Pigmented stoving lacquers of similar fastness properties are obtained by using 15–25 parts of the above alkyd resin or of an alkyd resin based on cotton seed oil, dehydrated castor oil, castor oil or synthetic fatty acids and replacing the above amount of melamine resin with 10–15 parts of the aforesaid melamine resin or of a condensation product obtained from formaldehyde with urea or benzoguanamine. Pigmented stoving lacquers of similar good fastness properties and a similar shade are obtained by replacing the above 4-(4-chloro-benzoylamino)-1-[4-(3 - chloro-phenylcarbamoyl)-benzoylamino]-anthraquinone wtih corresponding amounts of finely divided 4-(4-chloro-benzoylamino)-1-[4-(4-methyl-phenylcarbamoyl)-benzoylamino]-anthraquinone,
4-(4-chloro-benzoylamino)-1-[4-(2,3-dichloro-phenylcarbamoyl)-benzoylamino]-anthraquinone,
4-benzoylamino-1-[4-(2,3-dichloro-phenylcarbamoyl)-benzoylamino-anthraquinone,
4-benzoylamino-1-[4-(2,5-dichloro-phenylcarbamoyl)-benzoylamino]-anthraquinone, or
4-benzoylamino-1-[4-(4-nitro-phenylcarbamoyl)-benzoylamino]-anthraquinone.

(a–II) Violet shades also occur by use of the following compounds:

1,4-di-[4-(2,5-dichloro-phenyl-carbamoyl)-benzoylamino]-anthraquinone,
1,4-di-[4-(2-chloro-5-methyl-phenyl-carbamoyl)-benzoylamino]-anthraquinone,
1,4-di-[4-(2,4,6-trimethyl-phenyl-carbamoyl)-benzoylamino]-anthraquinone,
5,1,4-di-[4-(n-butyl-carbamoyl)-benzoylamino]-anthraquinone,
5-nitro-1,4-di-[4-(n-dodecyl-carbamoyl)-benzoylamino]-anthraquinone,
5-nitro-1,4-di-[4-(2-chlorophenyl-carbamoyl)-benzoylamino]-anthraquinone, or
5-nitro-1,4-di-[4-(4-methyl-phenyl-carbamoyl)-benzoyl]-anthraquinone.

(a–III) The following compounds give blue lacquers:

1,5-dihydroxy-4,8-di-(4-phenyl-carbamoyl-benzoylamino)-anthraquinone,
1,5-dihydroxy-4,8-di-(4-methyl-carbamoyl-benzoylamino)-anthraquinone,
1,5-dihydroxy-4,8-di-(n-butyl-carbamoyl-benzoylamino)-anthraquinone,
1,8-dihydroxy-4,5-di-(4-phenyl-carbamoyl-benzoylamino)-anthraquinone,
1,8-dihydroxy-4,5-di-(4-methyl-carbamoyl-benzoyl)-anthraquinone,
1,5-dihydroxy-4,8-di-[4-(2-chloro-phenyl-carbamoyl)-benzoylamino]-anthraquinone, or
1,5-dihydroxy-4,8-di-(n-dodecyl-carbamoyl-benzoylamino)-anthraquinone.

(b) If, instead of the amount of pigment stated above, 1 to 10 parts of a mixture of titanium dioxide (rutile type) with one of the pigments stated in Example 1(a) are incorporated with the lacquer stated in Example 1(a) in a ratio of 0.5–50:1, then the same method of working up yields lacquer coats of the same fastness properties and a violet or blue shade shifting to white as the content of titanium dioxide increases.

(c) The 4-(4-chloro-benzoylamino) - 1 - [4 - (3-chlorophenylcarbamoyl) - benzoylamino] - anthraquinone described in Example 1(a–I) is prepared by heating 20 parts 4-amino-1-(4 - chloro-benzoylamino)-anthraquinone with 20 parts terephthalic acid dichloride in 400 parts nitrobenzene at 90–110° C. until the starting amine can no longer be detected. The 4-(4-chloro-benzoylamino)-1-(4-chloroformyl-benzoylamino)-anthraquinone present in the form of red needles is isolated and 10 parts thereof are heated in the presence of 3 parts of N,N-dimethyl-aniline and 4 parts 3-chloro-aniline in 200 parts nitrobenzene at 120–145° C. until the acid chloride is completely converted. The product is filtered off with suction at 100° C., washed with warm nitrobenzene, dimethyl formamide, methanol and hot water, and the dyestuff present in the form of violet needles is dried at 50° C. in a circulating air cabinet. The same compound is obtained, when the nitrobenzene is replaced with 1,2-dichlorobenzene and the N,N-dimethyl-aniline is replaced with equivalent amounts of sodium carbonate, potassium carbonate or pyridine.

The other compounds stated in Example 1(a–I) are obtained when the 4-amino-1-(4-chloro-benzoylamino)-anthraquinone is replaced with equivalent amounts of 4-amino-1-benzoylamino-anthraquinone or the 3-chloroaniline is replaced with equivalent amounts of 2,3- or 2,5-dichloroaniline or 4-nitro-aniline, or when 1-(4-chloro-benzoyl-amino) - 4 - (4 - chloroformyl-benzoylamino)-anthraquinone is reacted in p-toluidine as solvent and reaction partner at 140–160° C. The other dyestuffs described in the following Examples are obtained in an analogous manner.

The 1,4-di-[4-(2,5-dichloro-phenylcarbamoyl)-benzoylamino]-anthraquinone described in Example 1(a–II) is prepared, for example, by introducing 20 parts 1,4-diamino-anthraquinone at 80° C. with stirring into a solution of 100 parts terephthalic acid dichloride in 250 parts of aniline-free anhydrous nitrobenzene and stirring at 105–110° C. until the 1,4-diamino-anthraquinone is completely acylated. The mixture is allowed to cool, the precipitated 1,4-di-(4 - chloroformyl-benzoylamino)-anthraquinone which is present in the form of yellowish red prisms is filtered off with suction, the excess of terephthalic acid dichloride is washed out with anhydrous nitrobenzene, and the nitrobenzene-moist filter cake is reacted, after dilution with 560 parts of aniline-free anhydrous nitrobenzene, with 39 parts 2,5-dichloro-aniline in the presence of 20 parts N,N-dimethyl-aniline at 115–120° C., while stirring, until the acylation is complete. The product which is precipitated in the form of red-violet prisms is filtered off with suction at 100° C., washed with hot nitrobenzene until the discharge liquid is clear, then with alcohol and hot water, and dried at 50° C. in a circulating air cabinet.

The other compounds mentioned in Example 1(a–II) are obtained, when the 2,5-dichloro-aniline is replaced with equivalent amounts of 4-chloro-3-amino-toluene or 2,4,6-trimethyl-aniline, or the 1,4-diamino-anthraquinone is replaced with equivalent amounts of 5-nitro-1,4-diamino-anthraquinone and the 2,5-dichloro-aniline with equivalent amounts of p-toluidine, 2-chloro-aniline, n-butylamine at 70° C. or dodecylamine.

The dyestuffs described in the following Examples are obtained when the corresponding acid chlorides and amines are used.

The 1,5 - dihydroxy - 4,8-di-(4-phenylcarbamoyl-benzoylamino)-anthraquinone described in Example 1(a–III) is prepared for example, by introducing 20 parts 4,8-diamino-1,5-dihydroxy-anthraquinone at 80° C. with stirring into a solution of 100 parts terephthalic acid dichloride in 250 parts of aniline-free anhydrous nitrobenzene and 20 parts pyridine, and stirring at 80 to 115° C. until the 4,8-diamino-1,5-dihydroxy-anthraquinone is completely acylated. The precipitated 1,5-dihydroxy-4,8-di(4-chloroformyl-benzoylamino)-anthraquinone which is present in the form of violet prisms is filtered off with suction, the excess of terephthalic acid dichloride is washed out with anhydrous nitrobenzene, and the nitrobenzene-moist filter cake is reacted, after dilution with 400 parts of anhydrous nitrobenzene, with 60 parts aniline at 140–160° C., while stirring, until the acylation is complete. The product obtained in the form of dark-blue prisms is filtered off with suction at 100° C., washed with hot nitrobenzene until the discharge liquid is colourless, then with alcohol and hot water, and dried at 50° C. in a circulating air cabinet.

The other compounds mentioned in Example 1(a–III) are obtained when the aniline is replaced with 26 parts 2-chloro-aniline or 28 parts dodecylamine in the presence of 12 parts N,N-dimethyl-aniline, or when the reaction is carried out, instead of with aniline at 140–160° C., with 22 parts n-butylamine at 70 to 80° C., or by introducing methylamine at 100° C., or when 4,5-diamino-1,8-dihydroxy-anthraquinone is used as starting material. The other compounds according to the invention are prepared in an analogous way.

EXAMPLE 2

6 parts of finely divided 4-(3-trifluoromethyl benzoylamino) - 1 - (phenylcarbamoyl-benzoylamino)-anthraquinone are rubbed into 100 parts of a nitrocellulose lacquer consisting of 44 parts collodium wool (of low viscosity, 35%, butanol-moist), 5 parts dibutyl phthalate, 40 parts ethyl acetate, 20 parts toluene, 4 parts n-butanol, and 10 parts glycol monomethyl ether. After spreading and drying, there are obtained bluish red lacquer coats of outstanding fastness to light and overcoating.

The same results are obtained with the use of nitro-lacquers containing 10–15 parts of nitro cellulose, 5–10 parts of plasticiser, and 70–85 parts of a solvent mixture, preferably with the use of aliphatic esters such as ethyl acetate or butyl acetate, and of aromatic hydrocarbons such as toluene and xylene, and smaller amounts of aliphatic ethers such as glycol ethers, and of alcohols such as butanol. The plasticisers may comprise, for example, phthalic acid esters such as dioctyl phthalate, dibutyl phthalate; esters of phosphoric acid; castor oil by itself or in combination with oil-modified alkyd resins.

Lacquer coats of similar fastness properties are obtained with the use of other physically drying spirit, zapon and nitro lacquers, air-drying oil, synthetic resin and nitro combination lacquers, stove- and air-drying epoxide resin lacquers, possibly in combination with urea, melamine, alkyd or phenol resins.

Lacquer coats of similar fastness properties and a red shade are obtained with the use of corresponding amounts of finely divided 4-(3-trifluoromethyl-benzoylamino)-1-[4-(2-chloro-phenylcarbamoyl)-benzoylamino]-anthraquinone,
4-(3-trifluoromethyl-benzoylamino)-1-[4-(4-chloro-phenylcarbamoyl)-benzoylamino]-anthraquinone,
4-(3-trifluoromethyl-benzoylamino)-1-[4-(2,5-dichloro-phenylcarbamoyl)-benzoylamino]-anthraquinone,
4-(4-chloro-benzoylamino)-1-(4-dodecylcarbamoyl-benzoylamino)-anthraquinone,
4-(4-nitro-benzoylamino)-1-(4-phenylcarbamoyl-benzoylamino)-anthraquinone,
4-benzoylamino-1-(4-phenylcarbamoyl-benzoylamino)-anthraquinone,
4-benzoylamino-1-(4-methylcarbamoyl-benzoylamino)-anthraquinone,
4-benzoylamino-1-(4-isobutylcarbamoyl-benzoylamino)-anthraquinone,
4-benzoylamino-1-[4-(tert.-butyl-carbamoyl)-benzoylamino]-anthraquinone,
4-benzoylamino-1-(4-tetradecylcarbamoyl-benzoylamino)-anthraquinone,
4-benzoylamino-1-[4-(4-chloro-phenylcarbamoyl)-benzoylamino]-anthraquinone, instead of 4-(3-trifluoromethyl-benzoylamino)-1-(4-phenylcarbamoyl-benzoylamino)-anthraquinone.

Lacquer coats of similar fastness properties and a red shade are obtained with the use of corresponding amounts of finely divided 1,4-di-[4-(butylcarbamoyl)-benzoylamino]-anthraquinone,
1,4-di-[4-(isobutylcarbamoyl)-benzoylamino]-anthraquinone,
1,4-di-[4-(tert.-butylcarbamoyl)-benzoylamino]-anthraquinone,
1,4-di-[4-(n-dodecylcarbamoyl)-benzoylamino]-anthraquinone,
1,4-di-[4-(stearylcarbamoyl)-benzoylamino]-anthraquinone,
1,4-di-[4-(cyclohexylcarbamoyl)-benzoylamino]-anthraquinone,
1,4-di-[4-(β-phenyl-ethylcarbamoyl)-benzoylamino]-anthraquinone,
1,4-di-[4-(4-dodecyl-phenylcarbamoyl)-benzoylamino]-anthraquinone,
1,4-di-[4-(4-trifluoromethyl-phenylcarbamoyl)-benzoylamino]-anthraquinone,
1,4-di-[4-(4-chloro-2-trifluoromethyl-phenylcarbamoyl)-benzoylamino]-anthraquinone,
1,4-di-[4-(3-sulphamoyl-phenylcarbamoyl)-benzoylamino]-anthraquinone, or
1,4-di-{4-[3-(N-phenylsulphamoyl)-phenylcarbamoyl]-benzoylamino}-anthraquinone.

Lacquer coats of similar fastness properties and a yellow shade are obtained with the use of corresponding amounts of finely divided 1,5-di-[4-(n-butylcarbamoyl)-benzoylamino]-anthraquinone,
1,5-di-[4-(isobutylcarbamoyl)-benzoylamino]-anthraquinone,
1,5-di-[4-(tert.-butylcarbamoyl)-benzoylamino]-anthraquinone,
1,5-di-[4-(n-dodecylcarbamoyl)-benzoylamino]-anthraquinone,
1,5-di-[4-(stearylcarbamoyl)-benzoylamino]-anthraquinone,
1,5-di-[4-(cyclohexylcarbamoyl)-benzoylamino]-anthraquinone,
1,5-di-[4-(β-phenyl-ethylcarbamoyl)-benzoylamino]-anthraquinone,
1,5-di-[4-(4-dodecyl-phenylcarbamoyl)-benzoylamino]-anthraquinone,
1,5-di-[4-(4-trifluoromethyl-phenylcarbamoyl)-benzoylamino]-anthraquinone,
1,5-di-[4-(4-chloro-2-trifluoromethyl-phenylcarbamoyl)-benzoylamino]-anthraquinone,
1,5-di-[4-(4-sulphamoyl-phenylcarbamoyl)-benzoylamino]-anthraquinone, or
1,5-di-{4-[3-(N-phenylsulphamoyl)-phenylcarbamoyl]-benzoylamino}-anthraquinone.

EXAMPLE 3

5 parts of finely divided 4-benzoylamino-1-[4-(n-butylcarbamoyl)-benzoylamino]-anthraquinone are ground in 100 parts of a paraffin-free drying, unsaturated polyester resin in a porcelain ball mill. 10 parts monostyrene, 5 parts of a melamine/formaldehyde resin and 1 part of a paste of 40 parts cyclohexanone peroxide and 60 parts dibutyl phthalate are well stirred with this material and, finally, 4 parts of a drier solution (10% cobalt naphthenate in test benzine) and 1 part of a silicone oil solution (1% in xylene) are added. The mixture is applied to primed wood, and there is obtained a high-gloss Bordeaux lacquer coat which is fast to water and weather and eminently fast to light.

If the reaction lacquer derived from unsaturated polyester resin is replaced with amine-curing epoxide resin lacquers, using dipropylene diamine as amine component, then Bordeaux-coloured lacquer-coats of outstanding fastness to weather and blooming are obtained. Similar results are obtained by use of 1,4-di-[4-(4-methyl-phenylcarbamoyl)-benzoylamino]-anthraquinone and 1,8-di-[4-(methyl-phenylcarbamoyl)-benzoylamino]-anthraquinone.

EXAMPLE 4

(a) 100 parts of a 65% solution of an aliphatic polyester with about 8% free hydroxyl groups in glycol monomethyl ether acetate are ground with 5 parts of finely divided 4-(4-chlorobenzoylamino)-1-(4-methylcarbamoyl)-benzoylamino]-anthraquinone and then thoroughly mixed with 44 parts of 67% solution of the reaction product of 1 mol trimethylol-propane with 3 mol toluylene diisocyanate. Without adverse effect on the pot time, application of the mixture and reaction of the components leads to high-gloss red-violet polyurethane lacquer coats of outstanding fastness to blooming, light and weather.

Pigmentations of similar fastness are obtained with the use of other two-component lacquers derived from aromatic or aliphatic isocyanates and hydroxyl group-containing polyethers or polyesters, as well as with moisture-drying polyisocyanate lacquers giving polyurea coats.

(b) Pigmentations of similar fastness properties and a similar shade are obtained when corresponding amounts of 4-(4-methoxy-benzoylamino)-1-[4-(n-butyl-carbamoyl)-benzoylamino]-anthraquinone,
4-(4-chloro-benzoylamino)-1-[4-(2,4-dichloro-phenylcarbamoyl)-benzoylamino]-anthraquinone,
4-(4-chloro-benzoylamino)-1-[4-(2-chloro-5-trifluoromethyl-phenylcarbamoyl)-benzoylamino]-anthraquinone, 4-(4-chloro-benzoylamino)-1-[4-(4-dodecyl-phenylcarbamoyl)-benzoylamino]-anthraquinone,
4-(3-chloro-benzoylamino)-anthraquinone)-1-(4-methylcarbamoyl-benzoylamino)-anthraquinone, or
4-(2-chlorobenzoylamino)-1-(4-hexadecylcarbamoylbenzoylamino)-anthraquinone are used, instead of the dyestuff mentioned above in Example 4(a).

(c) Pigmentations of similar fastness properties and a similar shade are obtained when corresponding amounts of 1,4-di-[4-(2,3-dichloro-phenylcarbamoyl)-benzoylaminoanthraquinone,
1,4-di-[4-(methylcarbamoyl)-benzoylamino]-anthraquinone,
1,4-di-(4-phenylcarbamoyl-benzoylamino)-anthraquinone,
1,4-di-[4-(4-chloro-phenylcarbamoyl)-benzoylamino]-anthraquinone,
1,4-di-[4-(2-chlorophenylcarbamoyl)-benzoylamino]-anthraquinone,
1,4-di-[4-(5-nitro-2-methyl-phenylcarbamoyl)-benzoylamino]-anthraquinone,
1,4-di-[4-(4-anilino-phenylcarbamoyl)-benzoylamino]-anthraquinone,
1,4-di-[4-(4-carbamoyl-phenylcarbamoyl)-benzoylamino]-anthraquinone, or
1,4-di-[4-(pyrenyl-(1)-carbamoyl)-benzoylaminoanthraquinone are used, instead of the dystuff mentioned above in Example 4(a).

(d) Pigmentations of similar fastness properties and a blue shade are obtained when corresponding amounts of 4-hydroxy-1,4-[4-(2,3-dichloro-phenylcarbamoyl)-benzoylamino]-anthraquinone,
1,5-dihydroxy-4,8-di-(4-methylcarbamoyl-benzoylamino)-anthraquinone,
1,5-dihydroxy-4,8-di(4-phenylcarbamoyl-benzoylamino)-anthraquinone,
1,5-dihydroxy-4,8-di-[4-(4-chloro-phenylcarbamoyl)-benzoylamino]-anthraquinone,
1,5-dihydroxy-4,8-di-[4-(5-nitro-2-methyl-phenylcarbamoylbenzoylamino]-anthraquinone,
1,5-dihydroxy-4,8-di-[4-(4-anilino-phenylcarbamoyl)-benzoylamino]-anthraquinone,
1,5-dihydroxy-4,8-di-[4-(4-carbamoyl-phenylcarbamoyl)-benzoylamino]-anthraquinone, or
1,5-dihydroxy-4,3-di-[4-(pyrenyl-(1)-carbamoyl)-benzoylamino]-anthraquinone are used, intsead of the dyestuff mentioned above in Example 4(a).

EXAMPLE 5

5 parts of a fine paste obtained by kneading 50 parts 4-(4-chloro-benzoylamino)-1-[4 - (4-sulphamoyl-phenylcarbamoyl)-benzoylamino]-anthraquinone with 15 parts of an aryl polyglycol ether emulsifier and 35 parts of water are mixed with 10 parts of barite as filler, 10 parts of titanium dioxide (rutile type) as white pigment, and 40 parts of an aqueous disperse dye containing about 50% polyvinyl acetate. The paint is spread and, after drying, there are obtained red coats of very good fastness to lime and cement and outstanding fastness to weather and light.

The fine paste obtained by kneading is equally suitable for the pigmentation of clear polyvinyl acetate disperse dyes, for disperse dyes containing copolymers of styrene and maleic acids as binding agents, as well as for disperse dyes based on polyvinyl propionate, polymethacrylate or butadiene-styrene.

Coats of similar shade and similar fastness properties are obtained when the above 4-(4-chloro-benzoylamino)- 1-[4 - (4 - sulphamoyl-phenylcarbamoyl)-benzoylamino]-anthraquinone is replaced with corresponding amounts of 4-(4-chloro-benzoylamino)-1-(4-phenylcarbamoyl-benzoylamino)-anthraquinone,
4-(4-chloro-benzoylamino)-1-[4-(2-chloro-phenylcarbamoyl)-benzoylamino]-anthraquinone,
4-(4-chloro-benzoylamino)-1-[4-(4-chlorophenylcarbamoyl)-benzoylamino]-anthraquinone,
4-(4-chlorobenzoylamino)-1-[4-n-butylcarbamoyl)-benzoylamino]-anthraquinone,
4-(2-nitro-benzoylamino)-1-[4-(n-butylcarbamoyl)-benzoylamino]-anthraquinone,
4-(3-nitro-benzoylamino)-1-(4-phenylcarbamoyl-benzoylamino)-anthraquinone,
4-(4-chloro-3-nitro-benzoylamino)-1-[4-(heptadecyl-(9)-carbamoyl)-benzoylamino]-anthraquinone,
4-(3,5-dinitro-benzoylamino)-1-(4-stearylcarbamoyl-benzoylamino)-anthraquinone, or
4-(4-chlorobenzoylamino)-1-(4-cyclohexylcarbamoyl-benzoylamino)-anthraquinone.

Coats of similar shade and similar fastness properties are obtained when the above dyestuff is replaced with corresponding amounts of 1,4-di-[4-(4-sulphamoyl-phenylcarbamoyl)-benzoylamino]-anthraquinone,
1,4-di-[4-(2-hydroxyethyl-carbamoyl)-benzoylamino]-anthraquinone,
1,4-di-[4-(5-carboxy-pentylcarbamoyl)-benzoylamino]-anthraquinone,
1,4-di-[4-(4-methyl-cyclohexylcarbamoyl)-benzoylamino]-anthraquinone,
1,4-di-[4-(5-chloro-2-nitro-phenylcarbamoyl)-benzoylamino]-anthraquinone,
1,4-di-[4-(n-butylcarbamoyl)-benzoylamino]-anthraquinone,
1,4-di-[5-(n-butylcarbamoyl)-valerylamino]-anthraquinone,
1,4-di[4-(2-nitro-phenyl-carbamoyl)-benzoylamino]-anthraquinone,
1,4-di-[4-(3-nitro-phenylcarbamoyl)-benzoylamino]-anthraquinone,
1,4-di-[4-(4-nitro-phenylcarbamoyl)-benzoylamino]-anthraquinone, or
1,4-di-[4-(3,4-dichloro-phenylcarbamoyl)-benzoylamino]-anthraquinone.

Blue coats of similar fastness properties are obtained when the above dyestuff is replaced with corresponding amounts of 1,5-dihydroxy-4,8-di-[4-(4-sulphamoyl-phenylcarbamoyl)-benzoylamino]-anthraquinone,
1,5-dihydroxy-4,8-di-(4-phenylcarbamoyl-benzoylamino)-anthraquinone,
1,5-dihydroxy-4,8-di-[4-(2-chlorophenylcarbamoyl)-benzoylamino]-anthraquinone,
1,5-dihydroxy-4,8-di-[4-(4-chloro-phenylcarbamoyl)-benzoylamino]-anthraquinone,
1,5-dihydroxy-4,8-di-[4-(n-butylcarbamoyl)-benzoylamino]-anthraquinone,
1,5-dihydroxy-4,8-di[5-(n-butylcarbamoyl)-valerylamino]-anthraquinone,
1,5-dihydroxy-4,8-di-[4-(2-nitro-phenylcarbamoyl)-benzoylamino]-anthraquinone,
1,5-dihydroxy-4,8-di-[4-(3-nitro-phenylcarbamoyl)-benzoylamino]-anthraquinone,
1,5-dihydroxy-4,8-di-[4-(4-nitro-phenylcarbamoyl)-benzoylamino]-anthraquinone, or
1,5-dihydroxy-4,8-di-[4-(3,4-dichloro-phenylcarbamoyl)-benzoylamino]-anthraquinone.

EXAMPLE 6

10 parts of a pigment paste mentioned in Example 5 are mixed with a mixture of 5 parts of chalk and 5 parts of 20% size solution. A red wall paper coating colour is obtained yielding coats of outstanding fastness to light. For the preparation of the pigment paste there may also be used other non-ionic emulsifiers, such as the reaction products of nonylphenol with ethylene oxide, or ionic wetting agents, such as the sodium salts of alkylaryl-sulphonic acids, for example of dinaphthyl-methane-disulphonic acid, sodium salts of substituted sulphofatty acid esters, and sodium salts of paraffin-sulphonic acids in combination with alkyl polyglycol ethers.

EXAMPLE 7

A mixture of 65 parts polyvinyl chloride, 35 parts di-isooctyl phthalate, 2 parts dibutyl tin mercaptide, 0.5 parts titanium dioxide, and 0.5 parts 4-(4-chloro-benzoyl-amino)-1-[4-(2-chloro-phenylcarbamoyl)-benzoylamino]-anthraquinone, which has been finely divided by grinding with sodium chloride in the presence of test benzine, is coloured on mixing rolls at 165° C. An intensely Bordeaux-coloured mass is obtained, which can serve for the production of foils or mouldings. The colouration is characterised by excellent fastness to light and very good fastness to plasticisers.

Colourations of a red shade and similar fastness properties are obtained when the above 4-(4-chloro-benzoyl-amino)-1-[4-(2-chloro-phenylcarbamoyl)-benzoylamino]-anthraquinone is replaced with corresponding amounts of 4-(4-chlorobenzoylamino)-1-[4-(2,5-dichloro-phenyl-carbamoyl)-benzoylamino]-anthraquinone,
4-(4-chloro-benzoylamino)-1-[4-(4-trifluoromethyl-phenylcarbamoyl)-benzoylamino]-anthraquinone,
4-(4-chloro-benzoylamino)-1-[4-(4-methoxy-phenyl-carbamoyl)-benzoylamino]-anthraquinone,
4-(4-chloro-benzoylamino)-1-[4-(3-sulphacyclopentyl-S,S-dioxide-carbamoyl)-benzoylamino]-anthraquinone,
4-(3-trifluoromethyl-benzylamino)-1-(4-butylcarbamoyl-benzoylamino)-anhtraquinone, or
4-(4-nitro-benzoylamino)-1-(4-phenylcarbamoyl-benzoylamino)-anthraquinone.

Colourations of a similar shade and similar fastness properties are obtained when the above dyestuff is replaced with corresponding amounts of 1,4-di-[4-(n-butyl-carbamoyl)-benzoylamino]-anthra-quinone,
1,4-di-[4-(isobutylcarbamoyl)-benzoylamino]-anthra-quinone,
1,4-di-[4-(n-dodecylcarbamoyl)-benzoylamino]-anthra-quinone,
1,4-di-[4-(4-chloro-phenylcarbamoyl)-benzoylamino]-anthraquinone,
1,4-di-[4-(4-carbamoylphenylcarbamoyl)-benzoyl-amino]-anthraquinone,
1,4-di-[4-(4-sulphamoyl-phenylcarbamoyl)-benzoyl-amino]-anthraquinone,
1,4-di-[4-(3-hydroxy-propyl-carbamoyl)-benzoylamino]-anthraquinone,
1,4-di-[4-(4-acetyl-phenylcarbamoyl)-benzoylamino]-anthraquinone.

Colourations of a yellow shade and similar fastness properties are obtained when the above dyestuff is replaced with 4-hydroxy-1,5-di-[4-(butylcarbamoyl)-benzoylamino]-anthraquinone,
1,5-di-(4-phenylcarbamoyl-benzyolamino)-anthra-quinone,
1,5-di-[4-(methylcarbamoyl)benzoylamino]-anthra-quinone,
1,5-di-(3-phenylcarbamoyl)-benzoylamino-anthra-quinone,
1,5-di-[3-(4-chloro-phenylcarbamoyl)-benzoylamino]-anthraquinone,
1,8-di-[4-(methylcarbamoyl)-benzoylamino]-anthra-quinone,
1,8-di-(4-phenylcarbamoyl-benzoylamino)-anthra-quinone,
1,8-di-[4-(4-sulphamoyl-phenylcarbamoyl)benzoyl-amino]-anthraquinone,
1,8-di-[4-(4-carbamoyl-phenylcarbamoyl)-benzoyl-amino]-anthraquinone, or
1,5-di-[4-(4-carbamoyl-phenylcarbamoyl)-benzoyl-amino]-anthraquinone.

EXAMPLE 8

0.2 parts of finely divided 4-(4-chloro-benzoylamino)-1-(4-phenylcarbamoyl-benzoylamino)-anthraquinone are mixed with 100 parts of a polyethylene, polypropylene or polystyrene granulate. The mixture can either be immediately injection-moulded at 220 to 280° C. in an injection moulding machine, or it can be worked up in an extruder to produce coloured rods, or on mixing rolls to produce coloured rough sheets. If desired, the rods or rough sheets are granulated and injection-moulded in an injection-moulding machine.

The red mouldings are very fast to light and migration. In a similar manner, synthetic polyamides of caprolactam or adipic acid and hexamethylene diamine or condensation products of terephthalic acid and ethylene glycol can be coloured at 280–300° C., possibly under a nitrogen atmosphere. Similar red moldings are obtained by use of 1,4-di-[4-(n-butylcarbamoyl)-benzoylamino]-anthraquinone, and similarly blue moldings are obtained by use of 1,5-dihydroxy-4,8-di-(methylcarbamoyl-benzoyl-amino)-anthraquinone.

EXAMPLE 9

1 part of finely divided 4-benzoylamino-1-(4-phenyl-carbamoyl)-benzoylamino]-anthraquinone, 10 parts titanium dioxide (rutile type) and 100 parts of a copolymer derived from acylonitrile-butadiene-styrene and present in powdered form are mixed and coloured on mixing rolls at 140–180° C. A wine-red rough sheet is obtained, which is granulated and injection moulded at 200–250° C. in an injection-moulding machine. There are obtained wine-red mouldings of very good fastness to light and migration and excellent thermal stability.

In a similar manner, but at temperatures of 180–220° C. and without the addition of titanium dioxide, synthetic materials based on cellulose acetate, cellulose butyrate and mixtures thereof are coloured with similar fastness properties. Similar wine-red moldings are obtained by use of 1,4-di[4-(4-methyl-phenyl-carbamoyl)-benzoyl-amino]-anthraquinone and similar orange-colored moldings are obtained by use of 1,5-di-[4-(4-methyl-phenyl-carbamoyl-benzoylamino]-anthraquinone.

EXAMPLE 10

0.2 parts 4-benzoylamino - 1 - [4-(3,4-dichloro-phenyl-carbamoyl)-benzoylamino] - anthraquinone in finely divided form are mixed with 100 parts of a synthetic material based on polycarbonate in an extruder or a kneading worm at 250–280° C. and worked up into a granulate. A violet transparent granulate of outstanding fastness to light and thermal stability is obtained. Similar violet transparent granulates are obtained with 5,8-dihydroxy - 1,4 - di-(4-phenyl-carbamoyl-benzoylamino)-anthraquinone and blue transparent granulates are obtained with 1,5-dihydroxy-4,8-di-(4-phenyl-carbamoyl)-benzoylaminoanthraquinone.

EXAMPLE 11

90 parts of a slightly branched polypropylene glycol with a molecular weight of 2500 and a hydroxyl number of 56, 0.25 parts endoethylene-piperazine, 0.3 parts tin (II) octoate, 1.0 part of a polyether siloxane, 3.5 parts of water, 12.0 parts of a dispersion of 10 parts of finely divided 4-benzoylamino-1-(4-methylcarbamoyl)-benzoyl-amino]-anthraquinone in 50 parts of the stated polypropylene glycol are well mixed with one another and subsequently intimately mixed with 45 parts toluylene diisocyanate (80% 2,4- and 2,6-isomer), and poured into a mould. The mixture becomes turbid and formation of foam takes place. After 70 seconds, an intensely wine-red soft polyurethane foam has formed the pigmentation of which has outstanding fastness to light.

Reddish blue polyurethane soft foams of a similar light-fast pigmentation are obtained when the 4-benzoylamino-1 - (4 - methylcarbamoyl-benzoylamino)-anthraquinone is replaced with corresponding amounts of 2-bromo-4-(4-methyl-anilino)-1-(4-phenylcarbamoyl-benzoylamino)-anthraquinone,
2-bromo-4-(4-methyl-2,6-diethyl-anilino)-1-(4-phenyl-carbamoyl-benzoylamino)anthraquinone,
4-aniline-1-[4-(4-methyl-cyclohexylcarbamoyl)-benzoyl-amino]-anthraquinone,
4-anilino-1-[4-(hexahydrobenzylcarbamoyl)-benzoyl-amino]-anthraquinone,
4-anilino-1-[4-(2-hydroxy-ethylcarbamoyl)-benzoyl-amino]-anthraquinone,
4-anilino-1-[4-(3-hydroxy-propylcarbamoyl)-benzoyl-amino]-anthraquinone, or
4-anilino-1-[4-(3-chloro-phenylcarbamoyl)-benzoyl-amino]-anthraquinone.

Reddish blue polyurethane soft foams of a similar light-fast pigmentation are obtained when the above dyestuff is replaced with corresponding amounts of 1,5-di-[4-(4-methoxy-phenylcarbamoyl)-benzoylamino]-anthraquinone,
1,5-dihydroxy-4,8-di-[4-(methyl-carbamoyl)-benzoyl-amino]-anthraquinone,
1,5-dihydroxy-4,8-di-[4-(n-butylcarbamoyl)-benzoyl-amino]-anthraquinone,
1,5-dihydroxy-4,8-di-[4-n-dodecylcarbamoyl)-benzoyl-amino]-anthraquinone,
1,5-dihydroxy-4,8-di-[4-(4-chloro-phenylcarbamoyl)-benzoylamino]-anthraquinone,
1,5-dihydroxy-4,8-[4-(4-carbamoyl-phenylcarbamoyl)-benzoylamino]-anthraquinone,
1,5-dihydroxy-4,8-di[4-(4-sulphamoyl-phenylcarbamoyl)-benzoylamino]-anthraquinone, or
1,8-dihydroxy-4,5-[4-(4-sulphamoyl)-phenylcarbamoyl)-benzoylamino]-anthraquinone.

Reddish blue polyurethane soft foams of a similar light-fast pigmentation are obtained when the above dyestuff is replaced with corresponding amounts of 1,4-di-[4-(4-methoxy-phenylcarbamoyl)-benzoylamino]-anthraquinone,
1,4-di-{4-[2-(2-hydroxy-ethyl-amino)-ethylcarbamoyl]-benzoylamino}-anthraquinone,
1,4-di-(9-methylcarbamoyl-octadecanoylamino)-anthraquinone,
1,4-di-[3-(4-sulphamoyl-phenylcarbamoyl)-2-hydroxy-propionylamino]-anthraquinone,
1,4-di-[3-(3-carbamoyl-phenylcarbamoyl)-2-acetylamino-propionylamino]-anthraquinone,
1,4-di-(2,5-dimethoxy-4-phenyl-carbamoyl-benzoyl)-amino)-anthraquinone,
1,4-di(4-chloro-3-methylcarbamoyl-benzoyl-amino)-anthraquinone,
1,4-di-(2,5-difluoro-4-butylcarbamoyl-benzoylamino)-anthraquinone, or
1,4-di-[2,3,5,6-tetrachloro-4-(4-methyl-phenylcarbamoyl)-benzoylamino]-anthraquinone.

EXAMPLE 12

90 parts of a slightly branched polyester of adipic acid, diethylene glycol and trimethylol-propane with a molecular weight of 2000 and a hydroxyl number of 60 are mixed with the following components: 1.2 parts dimethyl-benzylamine, 2.5 parts sodium castor oil sulphate, 2.0 parts of an ethoxylated benzylated hydroxydiphenyl, 1.75 parts of water, 12 parts of a paste prepared by grinding 10 parts of finely divided 4-(4-chloro-benzoylamino)-1-[4 - (4 - carbamoyl-phenylcarbamoyl)-benzoylamino]-anthraquinone in 50 parts of the polyester mentioned above. After mixing, 40 parts toluylene diisocyanate (65% 2,4- and 35% 2,6-isomer) are added with stirring and the mixture is poured into a mould and foamed. After 60 seconds, a red-violet soft polyurethane foam has formed the colouraton of which is characterized by very good fastness to light. Green-blue colourations of similar fastness to light are obtained by using corresponding amounts of 4-anilino-1-[4-(2,3-dichlorophenylcarbamoyl)-benzoyl-amino]-anthraquinone,
4-anilino-1-[4-(2,5-dichloro-phenylcarbamoyl)-benzoyl-amino]-anthraquinone,
4-anilino-1-[4-(4-carbamoyl-phenylcarbamoyl)-benzoyl-amino]-anthraquinone,
4-(4-methoxy-anilino)-1-[4-(n-butylcarbamoyl)-benzoyl-amino]-anthraquinone, or
4-(4-methylanilino)-1-[4-(n-butylcarbamoyl)-benzoyl-amino]-anthraquinone, instead of the aforesaid 4-(4-chloro-benzoylamino) - 1-[4 - (4 - carbamoyl-phenylcarbamoyl) - benzoylamino]-anthraquinone.

Red colourations of similar fastness to light are obtained when the 4-(4-chloro-benzoylamino)-1-[4-(4-carbamoyl)-phenyl-carbamoyl)-benzoylamino] - anthraquinone is replaced with corresponding amounts of 4-chloroacetylamino-1-(4-benzylcarbamoyl-benzoyl-amino)-anthraquinone,
4-valerylamino-1-[4-(2-phenyl-ethylcarbamoyl)-benzoylamino]-anthraquinone,
4-stearoylamino-1-[4-(4-carbethoxy-phenylcarbamoyl)-benzoylamino]-anthraquinone,
4-(3-sulphamoyl-benzoylamino)-1-(4-phenylcarbamoyl-benzoylamino)-anthraquinone, or
2-methyl-4-(4-chlorobenzoylamino)-1-(4-phenylcarbamoyl-benzoylamino)-anthraquinone.

Green-blue colourations of similar fastness to light are obtained by using corresponding amounts of 1,4-di-[4-phenylcarbamoyl-phenylazoxyl)-benzoyl-amino]-anthraquinone,
1,4-di-[4-(4-butylcarbamoyl-phenyl-hydrazino)-benzoylamino]-anthraquinone,
1,4,-di(4-methyl-carbamoyl-benzyl)-benzoylamino]-anthraquinone,
1,4-di-[4-(4-benzoyl-phenylcarbamoyl)-benzoylamino]-anthraquinone,
1,4-di-[5-(4-methoxy-phenylcarbamoyl)-furanoyl-(2)-amino]-anthraquinone,
1,4-di-[5-(2-nitro-4-carbamoyl-phenylcarbamoyl)-thiophenyl-(2)-amino]-anthraquinone,
1,4-di-{4-[4-(4'-methylcarbamoyl-biphenyl-(4)-azo)-phenyl]-benzoylamino}anthraquinone,
1,4-di-[2-methoxy-4-phenylsulphonyl-phenylcarbamoyl)-benzoylamino]-anthraquinone,
1,4-di-[2,4-dicarbamoyl-phenylcarbamoyl)-benzoylamino]-anthraquinone,
1,4-di-[4-(6-carbamoyl-naphthyl-(2)-carbamoyl)-benzoylamino]-anthraquinone,
1,4-di-{4-[2-chloro-5-(2-hydroxyethyl-sulphamoyl)-phenylcarbamoyl]benzoylamino}-anthraquinone,
1,4-di-[4-(2-carbamoyl-5-sulphamoyl-phenylcarbamoyl)-benzoylamino]-anthraquinone,
1,4-di-{4-[4-(4-carbamoyl-phenylazo)-phenylcarbamoyl]-benzoylamino}-anthraquinone, and
1,4-di-(2,3,5,6-tetrafluoro-4-phenylcarbamoyl-benzoyl-amino)-anthraquinone gives red-violet colouration.

Green-blue colourations of similar fastness to light are obtained by using corresponding amounts of 3-chloro-1,5-di-(4-methyl-anilino)-4,8-di-[4-(2,3-di-chloro-phenylcarbamoyl)-benzoylamino]-anthraquinone,
5-amino-1-hydroxy-4,8-di-[4-(2,5-di-chloro-phenylcarbamoyl)-benzoylamino]-anthraquinone,
2,6-dibromo-4,8-dihydroxy-1,5-di-[4-(4-carbamoyl-phenylcarbamoyl)-benzoylamino]-anthraquinone,
4,8-diamino-1,5-di-[4-(n-butylcarbamoyl)-benzoylamino]-anthraquinone, and
1-benzoylamino-4,5-di-[4-(4-carbamoyl-phenylcarbamoyl)-benzoylamino]-anthraquinone gives red-violet colouration.

Green-blue colourations of similar fastness to light are obtained when the above dyestuff is replaced with corresponding amounts of one of the dyestuffs which are obtained by proceeding according to Example 1(c), but using, instead of 20 parts 1,4-diamino-anthraquinone, 29 parts of one of the two dyestuffs obtained when 1,5-dihydroxy-4,8-diamino- or 1,8-dihydroxy-4,5-diamino-anthraquinone is brominated in sulphuric acid in such a manner that the reaction product contains approximately one bromine atom per mol of 1,5-dihydroxy-4,8-diamino- or 1,8-dihydroxy-4,5-diamino-anthraquinone.

EXAMPLE 13

A printing ink prepared by grinding 35 parts of finely divided 4 - benzoylamino - 1-(4-phenylcarbamoyl-benzoylamino)-anthraquinone and 65 parts linseed oil and adding 1 part of a desiccator (Co-naphthenate, 50% in test benzine) yields red offset prints of high brilliancy and strength of colour and very good fastness to light and lacquering. The use of this printing ink in book printing, heliographic printing, lithographic printing or steel engraving printing leads to red prints of similar fastness properties. If the pigment is used for colouring pastes for sheet metal printing, or low viscosity pastes for heliogravure and printing inks, red prints of similar fastness properties are obtained.

If the 4-benzoylamino - 1-(4-phenyl carbamoyl-benzoylamino)-anthraquinone is replaced with corresponding amounts of 4-(3-chloro-benzoylamino)-1-(2,5-dichloro-4-phenylcarbamoyl-benzoylamino)-anthraquinone,
4-benzoylamino-1-(4-hydroxy-3-phenylcarbamoyl-benzoylamino)-anthraquinone,
4-(4-chloro-benzoylamino)-1-(6-phenylcarbamoyl-naphthoyl-(2)-amino)-anthraquinone,
4-(4-chloro-benzoylamino)-1-[4-(4-phenylcarbamoyl-phenyl)-benzoylamino]-anthraquinone,
4-benzoylamino-1-[4-(4-phenylcarbamoyl-phenoxy)-benzoylamino]-anthraquinone,
4-benzoylamino-1-[4-(2-phenylcarbamoyl-benzoyl)-benzoylamino]-anthraquinone,
4-benzoylamino-1-[4-(4-phenylcarbamoyl-phenylsulphonyl)-benzoylamino]-anthraquinone,
4-(4-nitro-benzoylamino)-1-(5-phenylcarbamoyl-valerylamino)-anthraquinone, then prints of a similar shade and similar brilliancy and fastness are obtained.

If the above pigment is replaced with corresponding amounts of 1,4-di-[4-(n-dodecylcarbamoyl)-benzoylamino]-anthraquinone,
2-phenoxy-1,4-di-[4-(4-trifluoromethyl-phenylcarbamoyl)-benzoylamino]-anthraquinone,
1,4-di-[5-(n-butylcarbamoyl)-valerylamino]-anthraquinone,
1,4-di-[4-(n-butylcarbamoyl)-benzoylamino]-anthraquinone,
1,4-di-[2,5-dichloro-4-(n-dodecylcarbamoyl)-benzoylamino]-anthraquinone,
1,4-di-[4-hydroxy-3-(n-dodecylcarbamoyl)-benzoylamino]-anthraquinone,
1,4-di-[6-(n-dodecylcarbamoyl)-naphthoyl-(2)-amino]-anthraquinone,
1,4-di-[4-[4-(n-dodecyl-carbamoyl)-phenyl]-benzoylamino]-anthraquinone,
1,4-di-[4-[4-(n-dodecylcarbamoyl)-phenoxy]-benzoylamino]-anthraquinone,
1,4-di-[4-[2-(n-dodecylcarbamoyl)-benzoyl]-benzoylamino]-anthraquinone or
1,4-di-[4-[4-(n-dodecylcarbamoyl)-phenylsulphonyl]-benzoylamino]-anthraquinone, then prints of a similar shade and similar brilliancy and fastness are obtained.

If the above pigment is replaced with corresponding amounts of 1,5-dihydroxy-4,8-di-(4-phenylcarbamoyl-benzoylamino)-anthraquinone,
1,5-dihydroxy-4,8-di-(4-methylcarbamoyl-benzoylamino)-anthraquinone,
1,5-dihydroxy-4,8-di-[4-(n-butylcarbamoyl-benzoylamino]-anthraquinone,
1,5-dihydroxy-4,8-di-[5-(n-butylcarbamoyl)-valerylamino]-anthraquinone,
1,5-dihydroxy-4,8-di-[2,5-dichloro-4-(n-dodecylcarbamoyl)-benzoylamino]-anthraquinone,
1,5-dihydroxy-4,8-di-(4-hydroxy-3-phenylcarbamoyl-benzoylamino)-anthraquinone,
1,5-dihydroxy-4,8-di-(6-phenylcarbamoyl-naphthoyl-(2)-amino)-anthraquinone,
1,5-dihydroxy-4,8-di-[4-(4-phenylcarbamoyl-phenyl)-benzoylamino]-anthraquinone,
1,5-dihydroxy-4,8-di-[4-(4-phenylcarbamoyl-phenoxy)-benzoylamino]-anthraquinone,
1,5-dihydroxy-4,8-di-[4-(2-phenylcarbamoyl-benzoyl)-benzoylamino]-anthraquinone, or
1,5-dihydroxy-4,8-di-[4-(4-phenylcarbamoyl-phenylsulphonyl)-benzoylamino]-anthraquinone, then prints of a blue shade and similar fastness are obtained.

EXAMPLE 14

A printing paste is prepared from 10 parts of a pigment fine paste described in Example 5, 100 parts of 3% tragacanth, 100 parts of a 50% egg albumin solution and 25 parts of a non-ionic wetting agent. A fabric of textile fibres is printed, steamed at 100° C., and a red or blue print is obtained, which is characterised by excellent fastness properties, especially fastness to light. Instead of tragacanth and egg albumin, other binding agents suitable for fixation on the fibre, for example, those derived from synthetic resin, British gum or cellulose glycollate, can be used in the printing mixture.

EXAMPLE 15

A mixture of 100 parts of light crepe, 2.6 parts sulphur, 1 part stearic acid, 1 part mercapto-benzothiazole, 0.2 parts hexamethylene-tetramine, 5 parts zinc oxide, 60 parts chalk and 2 parts titanium dioxide (anatase type) is coloured on mixing rolls at 50° C. with 2 parts 4-benzoylamino - 1 - [4 - (n - butylcarbamoyl)-benzoylamino]-anthraquinone and then vulcanized at 140° C. for 12 minutes. A wine-red vulcanization product of very good fastness to light is obtained.

A wine-red product is obtained also by use of 1,4-di-[4-(3,5 - dichloro - phenyl - carbamoyl) - benzoylamino]-anthraquinone and a yellow product is obtained with 1,8-di-[4 - (3,5 - dichlorophenyl - carbamoyl)-benzoylamino]-anthraquinone.

EXAMPLE 16

100 parts of a 20% aqueous paste of 4-(3-trifluoromethyl-benzoylamino) - 1 - [4-(4-nitrophenylcarbamoyl)-benzoylamino]-anthraquinone, prepared, for example, by dissolving the dyestuff in 96% sulphuric acid, pouring the solution on to ice, filtering and washing with water until neural, are admixed in a stirrer with 22,500 parts of an aqueous, approximately 9% viscose solution. The colored mass is stirred for 15 minutes, subsequently de-aerated and subjected to a spinning and desulphurizing process.

Orange-red filaments or foils of very good fastness to light are obtained. Also similar shades are obtained by use of 1,4 - di - [4-(2-methyl-benzothiazolyl-(6)-carbamoyl)-benzoylamino]-anthraquinone. Yellow filaments or foils of good fastness to light are obtained with 1,5-di-[4 - (4 - sulfamoyl-phenyl-carbamoyl)-benzoylamino]-anthraquinone.

Filaments or foils with a wine-red pigmentation of similar fastness are obtained when a 20% solution of acetyl cellulose in acetone, or a 15–25% solution of polyacrylonitrile in dimethyl formamide, which has been colored with finely divided 4-(4-chloro-benzoylamino)-1-[4-chlorophenyl-carbamoyl]-benzoylamino]-anthraquinone,
1,4-di-[4-(4-sulfamoyl-phenyl-carbamoyl)-benzoylamino]-anthraquinone, or
4-hydroxy-1,5-di[4-(4-sulfamoyl-phenyl-carbamoyl)-benzoylamino]-anthraquinone, is subjected to a dry spinning process.

EXAMPLE 17

10,000 parts of paper pulp containing 4 parts cellulose per 100 parts are treated in a hollander for about 2 hours. During this time, there are added at intervals of 15 minutes 4 parts of rosin size, then 30 parts of an approximately 15% pigment dispersion obtained by grinding 4.8 parts 4-(3-trifluoromethyl-benzoylamino)-1-[4-(4-chloro-phenylcarbamoyl)-benzoylamino]-anthraquinone with 4.8 parts dinaphthyl-methane-disulphonic acid and 22 parts of water in a ball mill, and then 5 parts aluminum sulphate. After finishing in a paper machine, a bluish red paper of outstanding fastness to light is obtained. Similar results are obtained with 1,4-di-[4-(n-butyl-carbamoyl)-benzoylamino]anthraquinone and 1,5-dihydroxy-4,8-di-(4-methyl-carbamoyl-benzoylamino)-anthraquinone.

EXAMPLE 18

The blue and red pigmented papers produced according to Example 17 are impregnated with a 55% solution of an urea-formaldehyde resin in n-butanol and stoved at 140° C. A bluish red laminate paper of very good fastness to migration and outstanding fastness to light is obtained.

A laminate paper of similar fastness properties is obtained by laminating a paper which was printed by the heliogravure process with a printing paste containing the red pigment fine pastes described in Example 5 and water-soluble or hydrolysable binding agents.

EXAMPLES 19–212

Fast pigmented stoving lacquers of the shades stated in the following Table are obtained according to Example 1(a), but using corresponding amounts of the finely divided dyestuff stated in the Table, instead of 4-(4-chloro-benzoylamino) - 1 - [4-(4-chloro-phenylcarbamoyl)-benzoylamino]-anthraquinone:

| Ex. | Dyestuff | Shade |
|---|---|---|
| 19 | 4-(4-chloro-benzoylamino)-1-[4-(n-butylcarbamoyl)-benzoylamino]-anthraquinone. | Red. |
| 20 | 4-(4-chloro-benzoylamino)-1-[4-(4-chlorophenyl-carbamoyl)-benzoylamino]-anthraquinone. | Bluish red. |
| 21 | 4-(4-chloro-benzoylamino)-1-[4-(4-carbamoylphenyl-carbamoyl)-benzoylamino]-anthraquinone. | Do. |
| 22 | 4-(4-chloro-benzoylamino)-1-(4-phenylcarbamoyl)-benzoylamino]-anthraquinone. | Red. |
| 23 | 4-(4-chloro-benzoylamino)-1-[4-(2-chlorophenyl-carbamoyl)-benzoylamino]-anthraquinone. | Bluish red. |
| 24 | 4-(4-chloro-benzoylamino)-1-[4-(3-dichlorophenyl-carbamoyl)-benzoylamino]-anthraquinone. | Do. |
| 25 | 4-(4-chloro-benzoylamino)-1-[4-(2-nitrophenyl-carbamoyl)-benzoylamino]-anthraquinone. | Red-brown. |
| 26 | 4-(4-chloro-benzoylamino)-1-[4-(3-nitrophenyl-carbamoyl)-benzoylamino]-anthraquinone. | Bluish red. |
| 27 | 4-(4-chloro-benzoylamino)-1-[4-(4-nitrophenyl-carbamoyl)-benzoylamino]-anthraquinone. | Red. |

EXAMPLE—Continued

| Ex. | Dyestuff | Shade |
|---|---|---|
| 28 | 4-(4-chloro-benzoylamino)-1-[4-(4-trifluoromethyl-phenylcarbamoyl)-benzoylamino]-anthraquinone. | Bluish red. |
| 29 | 4-(4-chloro-benzoylamino)-1-[4-(3-sulphamoylphenyl-carbamoyl)-benzoylamino]-anthraquinone. | Red. |
| 30 | 4-(4-chloro-benzoylamino)-1-[4-(3-thia-cyclopentyl-S,S-dioxide-carbamoyl)-benzoylamino]-anthraquinone. | Red. |
| 31 | 4-benzoylamino-1-[4-(2-chloro-phenylcarbamoyl)-benzoylamino]-anthraquinone. | Yellowish red. |
| 32 | 4-benzoylamino-1-[4-(3-chloro-phenylcarbamoyl)-benzoylamino]-anthraquinone. | Red. |
| 33 | 4-benzoylamino-1-[4-(2,5-dichloro-phenylcarbamoyl)-benzoylamino]-anthraquinone. | Red. |
| 34 | 4-benzoylamino-1-[4-(4-nitro-phenylcarbamoyl)-benzoylamino]-anthraquinone. | Red. |
| 35 | 4-(4-methoxy-benzoylamino)-1-[4-(2,5-dichloro-phenylcarbamoyl)-benzoylamino]-anthraquinone. | Bluish red. |
| 36 | 4-(4-methoxy-benzoylamino)-1-[4-(4-nitrophenyl-carbamoyl)-benzoylamino]-anthraquinone. | Violet. |
| 37 | 4-(3-trifluoromethyl-benzoylamino)-1-(4-phenyl-carbamoyl)-benzoylamino)-anthraquinone. | Bluish red. |
| 38 | 4-(3-trifluoromethyl-benzoylamino)-1-[4-(4-chloro-phenylcarbamoyl)-benzoylamino]-anthraquinone. | Do. |
| 39 | 4-(4-nitro-benzoylamino)-1-[4-(4-methylcarbamoyl-benzoylamino)-anthraquinone. | Do. |
| 40 | 4-(4-nitro-benzoylamino)-1-[4-(n-butylcarbamoyl)-benzoylamino]-anthraquinone. | Do. |
| 41 | 4-(4-nitro-benzoylamino)-1-[4-(n-dodecylcarbamoyl)-benzoylamino]-anthraquinone. | Do. |
| 42 | 4-(4-nitro-benzoylamino)-1-[4-(2-chlorophenylcar-bamoyl)-benzoylamino]-anthraquinone. | Red. |
| 43 | 4-(4-nitro-benzoylamino)-1-[4-(4-chlorophenylcar-bamoyl)-benzoylamino]-anthraquinone. | Bluish red. |
| 44 | 4-(4-nitro-benzoylamino)-1-[4-(2,5-dichlorophenylcar-bamoyl)-benzoylamino]-anthraquinone. | Do. |
| 45 | 4-(2,4-dichloro-benzoylamino)-1-[4-(5-carboxy-pentylcarbamoyl)-benzoylamino]-anthraquinone. | Red. |
| 46 | 4-(2,4-dichloro-benzoylamino)-1-{4-[2-hydroxy-ethylamino)-ethylcarbamoyl]-benzoylamino}-anthraquinone. | Red. |
| 47 | 4-(2,4-dichloro-benzoylamino)-1-[4-(3-butoxy-propylcarbamoyl)-benzoylamino]-anthraquinone. | Red. |
| 48 | 4-(2,4-dichloro-benzoylamino)-1-[4-(3,5-dichloro-phenylcarbamoyl)-benzoylamino]-anthraquinone. | Red. |
| 49 | 4-(2,5-dichloro-benzoylamino)-1-[4-(2-ethylmercapto-ethylcarbamoyl)-benzoylamino]-anthraquinone. | Red. |
| 50 | 4-(2,5-dichloro-benzoylamino)-1-[4-(benzoylmethyl-carbamoyl)-benzoylamino]-anthraquinone. | Red. |
| 51 | 4-(2,5-dichloro-benzoylamino)-1-[4-(2,3,5-trichloro-phenylcarbamoyl)-benzoylamino]-anthraquinone. | Yellowish red. |
| 52 | 4-(4-methyl-benzoylamino)-1-[4-(5-chloro-2-nitro-phenylcarbamoyl)-benzoylamino]-anthraquinone. | Red. |
| 53 | 4-(4-methyl-benzoylamino)-1-[4-(2,4-dinitrophenyl-carbamoyl)-benzoylamino]-anthraquinone. | Red. |
| 54 | 4-(4-methyl-benzoylamino)-1-[4-(6-bromo-2,4-dinitro-phenylcarbamoyl)-benzoylamino]-anthraquinone. | Red. |
| 55 | 4-(4-methyl-benzoylamino)-1-[4-(4-methylphenylcar-bamoyl)-benzoylamino]-anthraquinone. | Red. |
| 56 | 4-acetylamino-1-[4-(4-methyl-phenylcarbamoyl)-benzoylamino]-anthraquinone. | Red. |
| 57 | 5-nitro-4-benzoylamino-1-[4-(4-methyl-phenyl-carbamoyl)-benzoylamino]-anthraquinone. | Red. |
| 58 | 2-bromo-1-[4-(4-methyl-phenylcarbamoyl)-benzoylamino]-4-(4-methyl-benzenesulphamido)-anthraquinone. | Red. |
| 59 | 4-(4-trifluoromethyl-benzoylamino)-1-[4-(4-methyl-phenylcarbamoyl)-benzoylamino]-anthraquinone. | Red. |
| 60 | 4-benzoylamino-1-[4-(5-chloro-2-trifluoromethyl-phenylcarbamoyl)-benzoylamino]-anthraquinone. | Red. |
| 61 | 4-benzoylamino-1-[4-(5-nitro-2-methyl-phenylcar-bamoyl)-benzoylamino]-anthraquinone. | Red. |
| 62 | 4-benzoylamino-1-[4-(2-chloro-5-methyl-phenylcar-bamoyl)-benzoylamino]-anthraquinone. | Red. |
| 63 | 4-benzoylamino-1-[4-(3,5-bis-trifluoromethylphenyl-carbamoyl)-benzoylamino]-anthraquinone. | Red. |
| 64 | 4-benzoylamino-1-[4-(2,4,6-trimethyl-phenylcar-bamoyl)-benzoylamino]-anthraquinone. | Red. |
| 65 | 4-(3-chloro-benzoylamino)-1-[4-(4-methyl-3,6-diethyl-phenylcarbamoyl)-benzoylamino]-anthraquinone. | Red. |
| 66 | 4-3-chloro-benzoylamino)-1-[4-(5,6,7,8-tetrahydro-naphthyl-(1)-carbamoyl)-benzoylamino]-anthraquinone. | Red. |
| 67 | 4-(3-chloro-benzoylamino)-1-[4-(4-cyclohexylphenyl-carbamoyl)-benzoylamino]-anthraquinone. | Red. |
| 68 | 4-(3-chloro-benzoylamino)-1-(naphthyl-(1)-carbam-oyl-benzoylamino)-anthraquinone. | Red. |
| 69 | 4-(4-chloro-benzoylamino)-1-(4-anthracenyl-(2)-car-bamoyl-benzoylamino)-anthraquinone. | Red. |
| 70 | 4-(4-chloro-benzoylamino)-1-(4-pyrenyl-(1)-carbam-oyl-benzoylamino)-anthraquinone. | Red. |
| 71 | 4-(4-chloro-benzoylamino)-1-[4-(4-anilinophenylcar-bamoyl)-benzoylamino]-anthraquinone. | Red. |
| 72 | 4-(4-chloro-benzoylamino)-1-[4-(4-phenoxyphenyl-carbamoyl)-benzoylamino]-anthraquinone. | Red. |
| 73 | 4-(4-nitro-benzoylamino)-1-[4-(4-methylanilino)-phenylcarbamoyl]-benzoylamino]-anthraquinone. | Red. |
| 74 | 4-(4-nitro-benzoylamino)-1-[4-(4-methoxyanilino)-phenylcarbamoyl)-benzoylamino]-anthraquinone. | Red. |
| 75 | 4-(4-nitro-benzoylamino)-1-[4-(4-methylsulphonyl-phenylcarbamoyl)-benzoylamino]-anthraquinone. | Red. |
| 76 | 4-(3-trifluoromethyl-benzoylamino)-1-[4-(2-methoxy-5-phenylsulphonyl-phenylcarbamoyl)-benzoyl-amino]-anthraquinone. | Red. |
| 77 | 4-(3-trifluoromethyl-benzoylamino)-1-[4-(4-benzoyl-phenylcarbamoyl)-benzoylamino]-anthraquinone. | Red. |
| 78 | 4-(3-trifluoromethyl-benzoylamino)-1-[4-(4-acetyl-phenylcarbamoyl)-benzoylamino]-anthraquinone. | Red. |

EXAMPLE—Continued

| Ex. | Dyestuff | Shade |
|---|---|---|
| 79 | 4-(3-trifluoromethyl-benzoylamino)-1-[4-(3-carbamoyl-phenylcarbamoyl)-benzoylamino]-anthraquinone. | Red. |
| 80 | 4-(3-nitro-benzoylamino)-1-[4-(5-chloro-2-cyanophehyl carbamoyl)-benzoylamino]-anthraquinone. | Red. |
| 81 | 4-(3-nitro-benzoylamino)-1-[4-(2,4-dicyanophenyl-carbamoyl)-benzoylamino]-anthraquinone. | Red. |
| 82 | 4-(3-nitro-benzoylamino)-1-[4-(2,4-dicarbamoyl-phenylcarbamoyl)-benzoylamino]-anthraquinone. | Red. |
| 83 | 4-(3-nitro-benzoylamino)-1-[4-(6-carbamoylnaphthyl-(2)-carbamoyl)-benzoylamino]-anthraquinone. | Red. |
| 84 | 4-(3-nitro-benzoylamino)-1-{4-[2-chloro-5-(2-hydroxyethylsulphamoyl)-phenylcarbamoyl]-benzoylamino}-anthraquinone. | Red. |
| 85 | 4-(5-chloro-2-cyano-benzoylamino)-1-[4-(4-chloro-phenylcarbamoyl)-benzoylamino]-anthraquinone. | Red. |
| 86 | 4-(3-nitro-benzoylamino)-1-[4-(4-phenylsulphamoyl-phenylcarbamoyl)-benzoylamino]-anthraquinone. | Red. |
| 87 | 4-(3-sulphamoyl-benzoylamino)-1-[4-(4-methyl-phenylcarbamoyl)-benzoylamino]-anthraquinone. | Red. |
| 88 | 5-nitro-1-(4-chloro-benzoylamino)-4-(4-phenylcarbamoyl-benzoylamino)-anthraquinone. | Red. |
| 89 | 1-(4-phenylcarbamoyl-benzoylamino)-4-(4-methyl-benzene-sulphamido)-2-phenylsulphonylanthraquinone. | Red. |
| 90 | 1,5-dibenzoylamino-4-(4-phenylcarbamoylbenzoylamino)-anthraquinone. | Red. |
| 91 | 4-(3-trifluoromethyl-benzoylamino)-1-[4-(4-trifluoromethyl-phenylcarbamoyl)-benzoylamino]-anthraquinone-2-carbonamide. | Red. |
| 92 | 4-benzoylamino-1-[4-(2-carbamoyl-4-sulphamoyl-phenylcarbamoyl)-benzoylamino]-anthraquinone. | Red. |
| 93 | 4-benzoylamino-1-[4-(4-phenylazo-phenyl-carbamoyl)-benzoylamino]-anthraquinone. | Brown. |
| 94 | 4-benzoylamino-1-{4-[4-(4-carbamoyl-phenylazo)-benzoylamino]}-benzoylamino}-anthraquinone. | Do. |
| 95 | 4-benzoylamino-1-(4-pyridyl-(2)-carbamoylbenzoylamino)-anthraquinone. | Red. |
| 96 | 4-benzoylamino-1-[4-(α-picolylcarbamoylbenzoyl-amino)-anthraquinone. | Red. |
| 97 | 4-benoylamino-1-[4-(2-phenyl-benzotriazolyl-(5)-carbamoyl)-benzoylamino]-anthraquinone. | Red. |
| 98 | 4-benzoylamino-1-(4-thiazolyl-(2)-carbamoylbenzoyl-amino)-anthraquinone. | Red., |
| 99 | 4-benzoylamino-1-[4-(2-methyl-benzothiazolyl-(6)-carbamoyl)-benzoylmino]-anthraquinone. | Red. |
| 100 | 4-benzoylamino-1-(4-benzothiazolyl-(2)-carbamoyl-benzoylmino)-anthraquinone. | Red. |
| 101 | 4-(4-chloro-benzoylamino)-1-[4-chloro-3-(4-chloro-phenylcarbamoyl)-benzoylamino]-anthraquinone. | Red. |
| 102 | 4-(4-chloro-benzoylamino)-1-[3-(4-chlorophenyl-carbamoyl)-benzoylamino]-anthraquinone. | Red. |
| 103 | 1,4-di-(4-carbethoxy-phenylcarbamoyl)-benzoyl-amino]-anthraquinone. | Red. |
| 104 | 1,4-di-[4-(2-phenyl-benzotriazolyl-(5)-carbamoyl)-benzoylamino]-anthraquinone. | Red. |
| 105 | 1,4-di[4-(6-methoxy-benzothiazolyl-(2)-carbamoyl)-benzoylamino]-anthraquinone. | Red. |
| 106 | 1,4-di-[4-(γ-picolyl-carbamoyl)-benzoylamino]-anthraquinone. | Red. |
| 107 | 2-bromo-1,4-di[4-(4-methoxy-phenylcarbamoyl)-benzoylamino]-anthraquinone. | Red. |
| 108 | 2,3-dichloro-1,4-di-(4-phenylcarbamoylbenzoyl-amino)-anthraquinone. | Brown. |
| 109 | 2-nitro-1,4-di-(4-methylcarbamoyl-benzoylamino)-anthraquinone | Red. |
| 110 | 2-bromo-5-nitro-1,4-di-[4-(n-butylcarbamoyl)-benzoylamino]-anthraquinone. | Violet. |
| 111 | 5-benzoylamino-1,4-di-[4-(4-phenylcarbamoyl)-benzoylamino]-anthraquinone. | Red. |
| 112 | 5-acetylamino-1,4-di-[4-(4-sulphamoylphenyl-carbamoyl)-benzoylamino]-anthraquinone. | Red. |
| 113 | 2,3-diphenoxy-1,4-di-[4-(4-chloro-phenylcarbamoyl)-benzoylamino]-anthraquinone. | Red. |
| 114 | 5,8-dihydroxy-2-phenylmercapto-1,4-di-(4-phenyl-carbamoyl-benzoylamino)-anthraquinone. | Maroon. |
| 115 | 6-bromo-5,8-dihydroxy-2-phenylmercapto-1,4-di-(methylcarbamoyl-benzoylamino)-anthraquinone. | Do. |
| 116 | 1,4-di-[4-(n-butylcarbamoyl)-benzoylamino]-2-(4-chloro-phenylsulphonyl)-anthraquinone. | Red. |
| 117 | 1,4-di-(4-phenylcarbamoyl-benzoylamino)-anthraquinone-2-sulphonic acid phenyl ester. | Red. |
| 118 | 1,4-di-[4-(methylcarbamoyl)-benzoylamino]-anthraquinone. | Bluish red. |
| 119 | 1,4-di-[4-(n-butylcarbamoyl)-benzoylamino]-anthraquinone. | Do. |
| 120 | 1,4-di-[4-(n-tetradecylcarbamoyl)-benzoylamino]-anthraquinone. | Bordeaux. |
| 121 | 1,4-di-[4-(n-hexadecylcarbamoyl)-benzoylamino]-anthraquinone. | Do. |
| 122 | 1,4-di-(4-phenylcarbamoyl-benzoylamino)-anthraquinone. | Bluish red. |
| 123 | 1,4-di-[4-(3-chloro-phenylcarbamoyl)-benzoylamino]-anthraquinone. | Bordeaux. |
| 124 | 1,4-di-[4-(2,5-dichloro-phenylcarbamoyl)-benzoylamino]-anthraquinone. | Do. |
| 125 | 1,4-di-[4-(2,4,5-trichloro-phenylcarbamoyl)-benzoylamino]-anthraquinone. | Yellowish red. |
| 126 | 1,4-di-[4-(2-chloro-5-trifluoromethylphenyl-carbamoyl)-benzoylamino]-anthraquinone. | Bordeaux. |
| 127 | 1,4-di-[4-(3,5-di-trifluoromethyl-phenylcarbamoyl)-benzoylamino]-anthraquinone. | Do. |
| 128 | 1,4-di-[4-(4-methyl-2,6-diethyl-phenylcarbamoyl)-benzoylamino]-anthraquinone. | Do. |
| 129 | 1,4-di-[4-(naphthyl-(1)-carbamoyl)-benzoylamino]-anthraquinone. | Do. |
| 130 | 1,4-di-[4-(5-chloro-2-cyano-phenylcarbamoyl)-benzoylamino]-anthraquinone. | Bordeaux. |
| 131 | 1,4-di-[4-(2,4-dicyano-phenylcarbamoyl)-benzoyl-amino]-anthraquinone. | Do. |
| 132 | 1,4-di-[4-(4-carbamoyl-phenylcarbamoyl)-benzoyl-amino]-anthraquinone. | Bluish red. |
| 133 | 1,4-di-[4-(4-sulphamoyl-phenylcarbamoyl)-benzoyl-amino]-anthraquinone. | Bordeaux. |
| 134 | 1,4-di-[4-(4-phenylazo-phenylcarbamoyl)-benzoyl-amino]-anthraquinone. | Maroon. |
| 135 | 1,4-di-[4-(3-sulpha-cyclopentyl-S,S-dioxide-carbamoyl)-benzoylamino]-anthraquinone. | Bordeaux. |
| 136 | 1,4-di-[4-(pyridyl-(2)-carbamoyl)-benzoylamino]-anthraquinone. | Yellowish red. |
| 137 | 1,4-di-[4-(thiazolyl-(2)-carbamoyl)-benzoylamino]-anthraquinone. | Orange. |
| 138 | 1,4-di-[4-(benzothiazolyl-(2)-carbamoyl)-benzoyl-amino]-anthraquinone. | Do. |
| 139 | 1,4-di-[4-(3-methylcarbamoyl)-benzoylamino]-anthraquinone. | Do. |
| 140 | 1,4-di-[4-(4-hydroxy-3-(methylcarbamoyl)-benzoyl-amino]-anthraquinone. | Maroon. |
| 141 | 1,4-di-[6-(methylcarbamoyl)-naphthoyl-(2)-amino]-anthraquinone. | Bordeaux. |
| 142 | 1,4-di-(6-phenylcarbamoyl-napthoyl-(2)-amino)-anthraquinone. | Do. |
| 143 | 1,4-di-{4-[4-(methylcarbamoyl)-phenylsulphonyl]-benzoylamino}-anthraquinone. | Red. |
| 144 | 1,4-di-[4-(4-phenylcarbamoyl-benzoyl)-phenylsulphonyl)-benzoylamino]-anthraquinone. | Red. |
| 145 | 1,4-di-{4-[2-(methylcarbamoyl)-benzoyl]-benzoyl-amino}-anthraquinone. | Red. |
| 146 | 1,4-di-[4-(4-methylcarbamoyl)-phenylazo]-benzoyl-amino]-anthraquinone. | Maroon. |
| 147 | 1,4-di-{4-[4-(n-dodecylcarbamoyl)-phenylazo]-benzoylamino}-anthraquinone. | Bordeaux. |
| 148 | 1,4-di-[4-(4-phenylcarbamoyl-phenylazo)-benzoyl-amino]-anthraquinone. | Do. |
| 149 | 1,4-di-[1-(n-butylcarbamoyl)-formylamino]-anthraquinone. | Yellowish red. |
| 150 | 1,4-di-[1-(4-chloro-phenylcarbamoyl)-formylamino]-anthraquinone. | Do. |
| 151 | 1,4-di-[1-(4-carbamoyl-phenylcarbamoyl)-formyl-amino]-anthraquinone. | Do. |
| 152 | 1,4-di-[1-(4-sulphamoyl-phenylcarbamoyl)-formyl-amino]-anthraquinone. | Do. |
| 153 | 1,4-di-[3-(n-butylcarbamoyl)-propionylamino]-anthraquinone. | Red. |
| 153 | 1,4-di-[3-(2,5-dichloro-phenylcarbamoyl)-propionyl-amino]-anthraquinone. | Red. |
| 155 | 1,4-di-[3-(4-carbamoyl-phenylcarbamoyl)-propionyl-amino]-anthraquinone. | Red. |
| 156 | 1,4-di-[5-(n-butylcarbamoyl)-valerylamino-anthra-quinone. | Red. |
| 157 | 1,4-di-[5-(4-chloro-phenylcarbamoyl)-valerylamino]-anthraquinone. | Red. |
| 158 | 1,4-di-[5-(4-carbamoyl-phenylcarbamoyl-)-valeryl-amino]-anthraquinone. | Red. |
| 159 | 1,4-di-[5-(4-sulphamoyl-phenylcarbamoyl)-valeryl-amino]-anthraquinone. | Red. |
| 160 | 1,5-di-(4-phenylcarbamoyl-benzoylamino)-anthra-quinone. | Yellow. |
| 161 | 1,5-di-[4-(methylcarbamoyl)-benzoylamino]-anthra-quinone. | Do. |
| 162 | 1,5-di-[3-(methylcarbamoyl)-benzoylamino]-anthra-quinone. | Do. |
| 163 | 1,5-di-[3-(4-chloro-phenylcarbamoyl)-benzoylamino]-anthraquinone. | Do. |
| 164 | 1,8-di-[4-(methylcarbamoyl)-benzoylamino]-anthra-quinone. | Do. |
| 165 | 1,8-di-(4-phenylcarbamoyl-benzoylamino)-anthra-quinone. | Do. |
| 166 | 4-chloro-1,5-di-[4-(n-butylcarbamoyl)-benzoyl-amino]-anthraquinone. | Do. |
| 167 | 4-chloro-1,5-di-[4-(n-tetradecylcarbamoyl)-benzoyl-amino]-anthraquinone. | Do. |
| 168 | 4-chloro-1,5-di-[4-(n-hexadecylcarbamoyl)-benzoyl-amino]-anthraquinone. | Do. |
| 169 | 4-chloro-1,5-di-[4-(heptadecyl-(9)-carbamoyl)-benzoylamino]-anthraquinone. | Do. |
| 170 | 4-chloro-1,5-di-(4-allylcarbamoylbenzoylamino)-anthraquinone. | Do. |
| 171 | 4-chloro-1,5-di-[4-(2-hydroxyethylcarbamoyl)-benzoylamino]-anthraquinone. | Do. |
| 172 | 4-chloro-1,5-di-[4-(5-carboxypentylcarbamoyl)-benzoylamino]-anthraquinone. | Do. |
| 177 | 4-chloro-1,5-di-{4-[2-(2-hydroxyethyl-amino)-ethyl-carbamoyl]-benzoylamino}-anthraquinone. | Do. |
| 178 | 4-chloro-1,5-di-[4-(3-butoxy-propylcarbamoyl)-benzoylamino]-anthraquinone. | Do. |
| 179 | 4-chloro-1,5-di-[4-(3-sulpha-cyclopentyl-S,S-dioxide-carbamoyl)-benzoylamino]-anthraquinone. | Do. |
| 180 | 4-chloro-1,5-di-[4-(3-chloro-phenylcarbamoyl)-benzoylamino]-anthraquinone. | Do. |
| 181 | 4-chloro-1,5-di-[4-(2,4-dichloro-phenylcarbamoyl)-benzoylamino]-anthraquinone. | Do. |
| 182 | 4-chloro-1,5-di-[4-(2,4-dinitro-phenylcarbamoyl)-benzoylamino]-anthraquinone. | Do. |
| 183 | 4-hydroxy-1,5-di-[4-(4-methylcarbamoyl)-benzoylamino]-anthraquinone. | Maroon. |
| 184 | 4-hydroxy-1,5-di-[4-(n-dodecylcarbamoyl)-benzoylamino]-anthraquinone. | Bordeaux. |
| 185 | 4-hydroxy-1,5-di-(4-cyclohexylcarbamoyl)-benzoylamino)-anthraquinone. | Do. |
| 186 | 4-hydroxy-1,5-di-(4-phenylcarbamoyl-benzoylamino)-anthraquinone. | Maroon. |

| Ex. | Dyestuff | Shade |
|---|---|---|
| 187 | 4-hydroxy-1,5-di-[4-(4-trifluoromethylphenyl-carbamoyl)-benzoylamino]-anthraquinone. | Bordeaux. |
| 188 | 1,5-dihydroxy-4,8-di-(4-ethylcarbamoyl-benzoylamino)-anthraquinone. | Blue. |
| 189 | 1,5-dihydroxy-4,8-di-[4-(iso-butylcarbamoyl)-benzoylamino]-anthraquinone. | Do. |
| 190 | 1,5-dihydroxy-4,8-di-(4-cyclohexylcarbamoyl-benzoylamino-)-anthraquinone. | Do. |
| 191 | 1,5-dihydroxy-4,8-di-[4-(2-hydroxyethylcarbamoyl)-benzoylamino]-anthraquinone. | Do. |
| 192 | 1,5-dihydroxy-4,8-di-[4-(2-ethylmercaptoethyl-carbamoyl)-benzoylamino]-anthraquinone. | Do. |
| 193 | 1,5-dihydroxy-4,8-di-[4-(4-methyl-cyclohexyl-carbamoyl)-benzoylamino]-anthraquinone. | Do. |
| 194 | 1,5-dihydroxy-4,8-di-[4-(4-benzylcarbamoylbenzoyl)-amino]-anthraquinone. | Do. |
| 195 | 1,5-dihydroxy-4,8-di-[4-(benzoyl-methylcarbamoyl)-benzoylamino]-anthraquinone. | Do. |
| 196 | 1,5-dihydroxy-4,8-di-[4-(2,3-dichlorophenylcar-bamoyl)-benzoylamino]-anthraquinone. | Do. |
| 197 | 1,5-dihydroxy-4,8-di-[4-(2,5-dichlorophenylcar-bamoyl)-benzoylamino]-anthraquinone. | Do. |
| 198 | 1,5-dihydroxy-4,8-di-[4-(5-chloro-2-nitrophenyl-carbamoyl)-benzoylamino]-anthraquinone. | Do. |
| 199 | 1,5-dihydroxy-4,8-di-[4-(4-trifluoromethylphenyl-carbamoyl)-benzoylamino]-anthraquinone. | Do. |
| 200 | 1,5-dihydroxy-4,8-di-[4-(2-chloro-5-methylphenyl-carbamoyl)-benzoylamino]-anthraquinone. | Do. |
| 201 | 1,5-dihydroxy-4,8-di-[4-(2-chloro-5-trifluormethyl-phenylcarbamoyl)-benzylamino]-anthraquinone. | Do. |
| 202 | 1,5-dihydroxy-4,8-di-[4-(2,4,6-trimethylphenyl-carbamoyl)-benzoylamino]-anthraquinone. | Do. |
| 203 | 1,5-dihydroxy-4,8-di-[4-(naphthyl-(1)-carbamoyl)-benzoylamino]-anthraquinone. | Do. |
| 204 | 1,5-dihydroxy-4,8-di-[4-(4-methoxyphenylcar-bamoyl)-benzoylamino]-anthraquinone. | Do. |
| 205 | 1,5-dihydroxy-4,8-di-[4-(4-carbamoylphenylcar-bamoyl)-benzoylamino]-anthraquinone. | Do. |
| 206 | 1,5-dihydroxy-4,8-di-[4-(3-sulphamoylphenylcar-bamoyl)-benzoylamino]-anthraquinone. | Do. |
| 207 | 1,5-dihydroxy-4,8-di-[4-(4-sulphamoylphenylcar-bamoyl)-benzoylamino]-anthraquinone. | Do. |
| 208 | 1,8-dihydroxy-4,5-di-[4-(n-butylcarbamoyl)-benzoylamino]-anthraquinone. | Violet. |
| 209 | 1,8-dihydroxy-4,5-di-[4-(2,5-dichlorophenylcar-bamoyl)-benzoylamino]-anthraquinone. | Do. |
| 210 | 1,8-dihydroxy-4,5-di-[4-(2,4,5-trichlorophenylcar-bamoyl)-benzoylamino]-anthraquinone. | Do. |
| 211 | 1,8-dihydroxy-4,5-di-[4-(3,5-bis-trifluoromethyl-phenylcarbamoyl)-benzoylamino]-anthraquinone. | Do. |
| 212 | 1,5-dihydroxy-4,8-di-[4-(pyridyl-(2)-carbamoyl)-benzoylamino]-anthraquinone. | Blue. |

EXAMPLES 213–314

If the 4-(3-trifluoromethyl-benzoylamino)-1-(4-phenyl-carbamoyl-benzoylamino)-anthraquinone is replaced in Example 2 with corresponding amounts of the finely divided dyestuffs stated in the following Table, then fast pigmented nitro lacquers of the shades stated in the Table are obtained:

| Ex. | Dyestuff | Shade |
|---|---|---|
| 213 | 4-(2,5-dichloro-benzoylamino)-1-[4-(n-butyl-carbamoyl)-benzoylamino]-anthraquinone. | Red. |
| 214 | 4-(4-nitro-benzoylamino)-1-[4-(n-butylcarbamoyl)-benzoylamino]-anthraquinone. | Red. |
| 215 | 4-(4-methyl-benzoylamino)-1-[4-(n-butylcarbamoyl)-benzoylamino]-anthraquinone. | Red. |
| 216 | 4-(4-methoxy-benzoylamino)-1-[4-(n-butylcar-bamoyl)-benzoylamino]-anthraquinone. | Red. |
| 217 | 4-(4-trifluoromethyl-benzoylamino)-1-[4-(n-butyl-carbamoyl)-benzoylamino]-anthraquinone. | Red. |
| 218 | 4-(5-chloro-2-cyano-benzoylamino)-1-[4-(n-butyl-carbamoyl)-benzoylamino]-anthraquinone. | Red. |
| 219 | 4-acetylamino-1-[4-(n-butylcarbamoyl)-benzoyl-amino]-anthraquinone. | Red. |
| 220 | 1,5-dibenzoylamino-4-[4-(n-butylcarbamoyl)-benzoylamino]-anthraquinone. | Red. |
| 221 | 5-nitro-1-(4-chloro-benzoylamino)-4-(4-phenylcar-bamoyl-benzoylamino)-anthraquinone. | Red. |
| 222 | 5,8-dichloro-4-(4-benzoylamino)-1-(4-phenyl-carbamoyl-benzoylamino)-anthraquinone. | Red. |
| 223 | 4-(4-chloro-benzoylamino)-1-[4-(6-methoxybenzo-thiazolyl-(2)-carbamoyl)-benzoylamino]-anthra-quinone. | Red. |
| 224 | 4-(4-chloro-benzoylamino)-1-[4-(2-phenylbenzotri-azolyl-(5)-carbamoyl)-benzoylamino]-anthra-quinone. | Red. |
| 225 | 4-(4-chloro-benzoylamino)-1-(2-hydroxy-3-phenyl-carbamoyl-propionylamino)-anthraquinone. | Red. |
| 226 | 4-(4-chloro-benzoylamino)-1-(9-phenylcarbamoyl-octadecanoyl-amino)-anthraquinone. | Red. |
| 227 | 4-(4-chloro-benzoylamino)-1-(2,5-difluoro-4-phenyl-carbamoyl-benzoylamino)-anthraquinone. | Red. |
| 228 | 1-benzoylamino-4-(phenylcarbamoyl-formylamino)-anthraquinone. | Orange. |
| 229 | 1-benzoylamino-4-(3-phenylcarbamoylpropionyl-amino)-anthraquinone. | Red. |
| 230 | 1-benzoylamino-4-(7-phenylcarbamoylheptanoyl-amino)-anthraquinone. | Red. |
| 231 | 4-benzoylamino-1-(4-phenylcarbamoylnaphthoyl-(1)-amino)-anthraquinone. | Red. |
| 232 | 4-benzoylamino-1-(5-phenylcarbamoylnaphthoyl-(1)-amino)-anthraquinone. | Red. |
| 233 | 4-benzoylamino-1-(5-phenylcarbamoylfuranoyl-(2)-amino)-anthraquinone. | Red. |
| 234 | 4-benzoylamino-1-(5-phenylcarbamoyl-thiophenoyl-(2)-amino)-anthraquinone. | Red. |
| 235 | 4-benzoylamino-1-(6-phenylcarbamoylpyridinoyl-(2)-amino-anthraquinone. | Red. |
| 236 | 1-benzoylamino-4-(4-phenylcarbamoyl-3-oxabutyryl-amino)-anthraquinone. | Red. |
| 237 | 1-benzoylamino-4-(4-phenylcarbamoyl-3-thia-butyrylamino)-anthraquinone. | Red. |
| 238 | 1-benzoylamino-4-(4-phenylcarbamoyl-3-azabutyryl-amino)-anthraquinone. | Red. |
| 239 | 1-benzoylamino-4-(4-phenylcarbamoyl-3-oxobutyryl-amino)-anthraquinone. | Red. |
| 240 | 1-benzoylamino-4-(2-acetylamino-3-phenylcar-bamoyl-propionylamino)-anthraquinone. | Red. |
| 241 | 4-benzoylamino-1-(2,5-dimethoxy-4-phenylcar-bamoyl-benzoylamino)-anthraquinone. | Red. |
| 242 | 4-benzoylamino-1-(2,3,5,6-tetrafluoro-4-phenylcar-bamoyl-benzoylamino)-anthrqauinone. | Red. |
| 243 | 4-benzoylamino-1-[4-(4-phenylcarbamoylphenylazo)-benzoylamino]-anthraquinone. | Red. |
| 244 | 4-benzoylamino-1-[4-(4-phenylcarbamoylphenyl-azoxy)-benzoylamino]-anthraquinone. | Red. |
| 245 | 4-benzoylamino-1-{4-[4-(4'-phenylcarbamoyl-biphenyl-(4)-azo]-phenyl]-benzoylamino}-anthraquinone. | Red. |
| 246 | 4-benzoylamino-1-[(4-phenylcarbamoylbenzyl)-benzoylamino]-anthraquinone. | |
| 247 | 4-benzoylamino-1-[4-(4-phenylcarbamoylphenyl-hydrazino)-benzoylamino]-anthraquinone. | Red. |
| 248 | 1-benzoylamino-4-(3-phenylcarbamoylacryloyl-amino)-anthraquinone. | Red. |
| 249 | 1-benzoylamino-4-(2-phenylcarbamoyl-3,4,5,6-tetrahydro-benzoylamino)-anthraquinone. | Red. |
| 250 | 1-benzoylamino-4-(4-phenylcarbamoyl-hexahydro-benzoylamino)-anthraquinone. | Red. |
| 251 | 4-benzoylamino-1-(3-nitro-4-phenylcarbamoyl-benzoylamino)-anthraquinone. | Red. |
| 252 | 4-benzoylamino-1-(3-chloro-4-phenylcarbamoyl-benzoylamino)-anthraquinone. | Red. |
| 253 | 4-benzoylamino-1-(2,3,5,6-tetrachloro-4-phenyl-carbamoyl-benzoylamino)-5,8-dihydroxy-anthra-quinone. | Violet. |
| 254 | 4-methylamino-1-[4-(4-sulphamoyl-phenylcar-bamoyl)-benzoylamino]-anthraquinone. | Blue. |
| 255 | 4-cyclohexylamino-1-[-(4-sulphamoylphenyl-carbamoyl)-benzoylamino]-anthraquinone. | Do. |
| 256 | 4-(4-acetylamino-anilino)-1-[4-(4-sulphamolyl-phenylcarbamoyl)-benzoylamino]-anthraquinone. | Do. |
| 257 | 1,4-di-[4-(heptadecyl-(9)-carbamoyl)-benzoyl-amino]-anthraquinone. | Red. |
| 258 | 1,4-di-[4-(5-carboxy-pentylcarbamoyl)-benzoyl-amino]-anthraquinone. | Red. |
| 259 | 1,4-di-[4-(3-butoxy-propylcarbamoyl)-benzoyl-amino]-anthraquinone. | Red. |
| 260 | 1,4-di-[4-(2-ethylmercapto-ethylcarbamoyl)-ben-zoylamino]-anthraquinone. | Red. |
| 261 | 1,4-di-[4-(hexahydro-benzylcarbamoyl)-benzoyl-amino]-anthraquinone. | Red. |
| 262 | 1,4-di-[4-(allylcarbamoyl)-benzoylamino]-anthra-quinone. | Red. |
| 263 | 1,4-di-[4-(benzoyl-methylcarbamoyl)-benzoyl-amino]-anthraquinone. | Red. |
| 264 | 1,4-di-[4-(benzylcarbamoyl)-benzoylamino]-anthraquinone. | Red. |
| 265 | 1,4-di-[4-(2,4-dinitro-phenylcarbamoyl)-benzoyl-amino]-anthraquinone. | Yellowish red. |
| 266 | 1,4-di-[4-(2-bromo-4,6-dinitro-phenylcarbamoyl)-benzoylamino]-anthraquinone. | Do. |
| 267 | 1,4-di-[4-(5,6,7,8-tetrahydro-naphthyl-(1)-car-bamoyl)-benzoylamino]-anthraquinone. | Red. |
| 268 | 1,4-di-[4-(4-cyclohexyl-phenylcarbamoyl)-benzoyl-amino]-anthraquinone. | Red. |
| 269 | 1,4-di-[4-(anthracenyl-(2)-carbamoyl)-benzoyl-amino]-anthraquinone. | Red. |
| 270 | 1,4-di-(3-phenylcarbamoyl-benzoylamino)-anthra-quinone. | Red. |
| 271 | 1,4-di-[3-(4-chloro-phenylcarbamoyl)-benzoylamino]-anthraquinone. | Red. |
| 272 | 1,4-di[3-[4-(4-methyl-anilino)-phenylcarbamoyl]-benzoylamino]-anthraquinone. | Red. |
| 273 | 1,4-di-[3-(4-phenoxy-phenylcarbamoylbenzoyl-amino]-anthraquinone. | Red. |
| 274 | 1,4-di[3-[4-(4-methoxy-anilino)-phenylcarbamoyl]-benzoylamino]-anthraquinone. | Red. |
| 275 | 1,4-di[3-[4-methylsulphonyl-phenylcarbamoyl)-benzoylamino]-anthraquinone. | Red. |
| 276 | 1,4-di[4-(n-butylcarbamoyl)-butyrylamino]-anthraquinone. | Red. |
| 277 | 1,4-di-[7-(n-butylcarbamoyl)-heptanoylamino]-anthraquinone. | Red. |
| 278 | 1,4-di-[4-(n-butylcarbamoyl)-3-oxa-butyrylamino]-anthraquinone. | Red. |
| 279 | 1,4-di-[4-(n-butylcarbamoyl)-3-sulphabutyryl-amino]-anthraquinone. | Red. |
| 280 | 1,4-di-[4-(n-butylcarbamoyl)-3-aza-butyrylamino]-anthraquinone. | Red. |
| 281 | 1,4-di-[4-(n-butylcarbamoyl)-3-oxo-butyrylamino]-anthraquinone. | Red. |
| 282 | 1,4-di-[4-(n-butylcarbamoyl)-hexahydrobenzoyl-amino]-anthraquinone. | Red. |
| 283 | 1,4-di-[trans-3-(n-butylcarbamoyl)-acryloylamino]-anthraquinone. | Red. |

EXAMPLE—Continued

| Ex. | Dyestuff | Shade |
|---|---|---|
| 284 | 1,4-di-[2-(n-butylcarbamoyl)-3,4,5,6-tetrahydrobenzoylamino]-anthraquinone. | Yellowish red. |
| 285 | 1,4-di-[4-(n-butylcarbamoyl)-naphthoyl-(1)-amino]-anthraquinone. | Red. |
| 286 | 1,4-di-[6-(n-butylcarbamoyl)-pyridinoyl-(2)-amino]-anthraquinone. | Yellowish red. |
| 287 | 1,5-di-(1-phenylcarbamoyl-formylamino)-anthraquinone. | Yellow. |
| 288 | 1,5-di-(3-butylcarbamoyl-propionylamino)-anthraquinone. | Do. |
| 289 | 1,5-di-(7-methy carbamoyl-heptanoyl)-anthraquinone. | Do. |
| 290 | 1,5-di-(4-phenylcarbamoyl-3-oxa-butyrylamino)-anthraquinone. | Do. |
| 291 | 1,5-di-(4-phenylcarbamoyl-3-sulpha-butyrylamino)-anthraquinone. | Do. |
| 292 | 1,5-di-(4-phenylcarbamoyl-3-aza-butyrylamino)-anthraquinone. | Do. |
| 293 | 1,5-di-(4-phenylcarbamoyl-hexahydro-benzoylamino)-anthraquinone. | Do. |
| 294 | 1,5-di-(trans-3-phenylcarbamoyl-acryloylamino)-anthraquinone. | Do. |
| 295 | 1,5-di-(2,5-dimethoxy-4-phenylcarbamoylbenzoylamino)-anthraquinone. | Do. |
| 296 | 1,5-di-[4-(6-bromo-2,4-dinitro-phenylcarbamoyl)-benzoylamino]-anthraquinone. | Orange. |
| 297 | 1,5-di-[2,5-difluoro-4-(4-methyl-2,5-diethylphenyl-carbamoyl)-benzoylamino]-anthraquinone. | Yellow. |
| 298 | 1,5-di-[4-(5,6,7,8-tetrahydro-naphthyl(1)-carbamoyl)-benzoylamino]-anthraquinone. | Do. |
| 299 | 1,5-di-[4-(4-cyclohexyl-phenylcarbamoyl)-benzoylamino]-anthraquinone. | Do. |
| 300 | 1,5-di-[4-(anthracenyl-(2)-carbamoyl)-benzoylamino]-anthraquinone. | Do. |
| 301 | 2,4,6,8-tetrabromo-1,5-di-(4-phenylcarbamoyl-benzoylamino)-anthraquinone. | Orange. |
| 302 | 1,5-dihydroxy-4,8-di-(4-methylcarbamoylbenzoylamino)-anthraquinone. | Blue. |
| 303 | 1,5-dihydroxy-4,8-di-[4-(n-dodecylcarbamoyl)-benzoylamino]-anthraquinone. | Do. |
| 304 | 1,5-dihydroxy-4,8-di-(4-phenylcarbamoylbenzoylamino)-anthraquinone. | o. |
| 305 | 1,5-dihydroxy-4,8-di-(4-phenylcarbamoylbutyryl-amino)-anthraquinone. | Do. |
| 306 | 1,5-dihydroxy-4,8-di-(4-chloro-3-methylcarbamoyl-benzoylamino)-anthraquinone. | Do. |
| 307 | 1,5-dihydroxy-4,8-di-[2,5-difluoro-4-(4-sulphamoyl-phenylcarbamoyl)-benzoylamino]-anthraquinone. | Do. |
| 308 | 1,5-dihydroxy-4,8-di-[6-(4-trifluoromethyl-phenyl-carbamoyl)-naphthoyl-(2)-amino]-anthraquinone. | Do. |
| 309 | 1,5-dihydroxy-4,8-di-[4-(4-methylcarrbamoyl-phenyl)-benzoylamino]-anthraquinone. | Do. |
| 310 | 1,5-dihydroxy-4,8-di-[2-(n-butylcarbamoyl)-pyridinoyl-(2)-amino]-anthraquinone. | Do. |
| 311 | 1,5-dimethoxy-4,8-di-(4-phenylcarbamoylbenzoyl-amino)-anthraquinone. | Violet. |
| 312 | 3-bromo-1-amino-5-hydroxy-4,8-di-(4-phenyl-carbamoyl-benzoylamino)-anthraquinone. | Blue. |
| 313 | 2-bromo-5-amino-1-hydroxy-4,8-di-(4-phenyl-carbamoyl-benzoylamino)-anthraquinone. | Do. |
| 314 | 2-(4-methoxy-phenyl)-4,8-dihydroxy-1,5-di-(4-phenylcarbamoyl-benzoylamino)-anthraquinone. | Do. |

EXAMPLES 315–344

Fast coats of the shades stated in the Table are obtained according to Example 5, but using fine pastes of the dyestuffs stated in the Table, in place of the fine paste of 4-(4-chloro-benzoylamino-1-[4-(4-sulphamoyl-phenyl-carbamoyl)-benzoylamino]-anthraquinone:

| Ex. | Dyestuff | Shade |
|---|---|---|
| 315 | 4-(2-chloro-benzoylamino)-1-[3-(2-nitro-4-carbamoyl-phenylcarbamoyl)-benzoylamino]-anthraquinone. | Red. |
| 316 | 4-(3-chloro-benzoylamino)-1-[3-(2-nitro-4-carbamoyl-phenylcarbamoyl)-benzoylamino]-anthraquinone. | Red. |
| 317 | 4-benzoylamino-1-[4-(4-chlorophenylcarbamoyl)-benzoylamino]-anthraquinone. | Red. |
| 318 | 4-(3-trifluoromethyl-benzoylamino)-1-[4-(n-butyl-carbamoyl)-benzoylamino]-anthraquinone. | Red. |
| 319 | 4-(4-nitro-benzoylamino)-1-(4-phenylcarbamoyl-benzoylamino)-anthraquinone. | Red. |
| 320 | 1,4-di-(4-phenylcarbamoyl-benzoylamino)-2-(4-methoxy-phenyl)-3-cyano-anthraquinone. | Maroon. |
| 321 | 2-bromo-5-nitro-1,4-di-[4-(4-sulphamoylphenylcarbamoyl)-benzoylamino]-anthraquinone. | Violet. |
| 322 | 5-nitro-1,4-di-(4-phenylcarbamoyl-benzoylamino)-anthraquinone. | Do. |
| 323 | 1,4-di-(4-carbamoyl-phenylcarbamoyl)-benzoylamino-anthraquinone-2-carbonamide. | Red. |
| 324 | 1,4-di-[4-(3-sulphamoyl-phenylcarbamoyl)-benzoylamino]-anthraquinone. | Bordeaux. |
| 325 | 1,4-di-[3-(4-sulphamoyl-phenylcarbamoyl)-benzoylamino]-anthraquinone. | Do. |
| 326 | 1,4-di-[4-(4-carbamoyl-phenylcarbamoyl)-benzoylamino]-2-phenoxy-anthraquinone. | Red. |
| 327 | 1,5-di-(4-phenylcarbamoyl-benzoylamino)-anthraquinone. | Yellow. |
| 328 | 1,5-di-{4-[4-methyl-anilino)-phenylcarbamoyl]-benzoylamino}-anthraquinone. | Do. |
| 329 | 1,5-di-[4-(4-phenoxy-phenylcarbamoyl)-benzoylamino]-anthraquinone. | Do. |

EXAMPLE—Continued

| Ex. | Dyestuff | Shade |
|---|---|---|
| 330 | 1,5-di-[4-(4-methylsulphonyl-phenylcarbamoyl)-benzoylamino]-anthraquinone. | Yellow |
| 331 | 1,5-di-(9-phenylcarbamoyl-octadecanoyl)-(1)-amino)-anthraquinone. | Do. |
| 332 | 1,5-di-(2-hydroxy-3-phenylcarbamoylpropionyl-amino)-anthraquinone. | Do. |
| 333 | 1,5-di-(2-acetylamino-2-phenyl-carbamoylpropionyl-amino)-anthraquinone. | Do. |
| 334 | 1,5-di-[4-(4-phenylcarbamoyl-phenylsulphonyl)-benzoylamino]-anthraquinone. | Do. |
| 335 | 4-hydroxy-1,5-di-(4-methylcarbamoylbenzoyl-amino)-anthraquinone. | Violet. |
| 336 | 4-hydroxy-1,5-di-[4-(3-carbamoyl-phenylcarbamoyl)-3-oxo-butyrylamino]-anthraquinone. | Maroon. |
| 337 | 4-hydroxy-1,5-di-[2-(4-ethoxycarbonylphenylcarbamoyl)-3,4,5,6-tetrahydrobenzoylamino]-anthraquinone. | Do. |
| 338 | 4-hydroxy-1,5-di-[4-(4-methylcarbamoylbenzyl)-benzoylamino]-anthraquinone. | Violet. |
| 339 | 4-hydroxy-1,5-di-[4-(4-benzoyl-phenylcarbamoyl)-benzoylamino]-anthraquinone. | Do. |
| 340 | 4-hydroxy-1,5-di-{4-[4-(4'-methylcarbamoyl-biphenyl-(4)-azo)-phenyl]-benzoylamino}-anthraquinone. | Maroon. |
| 341 | 1,5-dihydroxy-4,8-di-(4-methylcarbamoylbenzoyl-amino)-anthraquinone. | Blue. |
| 342 | 1,5-dihydroxy-4,8-di-]4-[4-(n-butylcarbamoyl)-phenylazo]-benzoylamino)-anthraquinone. | Do. |
| 343 | 1,5-dihydroxy-4,8-di-[5-(4-carbamoylphenylcarbamoyl)-furanoyl-(2)-amino]-anthraquinone. | Do. |
| 344 | 1,5-dihydroxy-4,8-di-[5-(4-carbamoylphenylcarbamoyl)-thiophenoyl-(2)-amino]-anthraquinone. | Do. |

EXAMPLES 345–367

Fast pigmented polyvinyl chloride of the shades stated in the following Table is obtained according to Example 7, but using the finely divided dyestuffs stated in the Table, instead of 4 - (4-chloro-benzoylamino)-1-[4-(2-chlorophenyl-carbamoyl)-benzoylamino]-anthraquinone:

| Ex. | Dyestuff | Shade |
|---|---|---|
| 345 | 4-(4-chloro-benzoylamino)-1-(4-phenylcarbamoyl-benzoylamino)-anthraquinone. | Red. |
| 346 | 4-(4-chloro-benzoylamino)-1-[4-(4-sulphamoyl-phenylcarbamoyl)-benzoylamino]-anthraquinone. | Red. |
| 347 | 4-(3-chloro-benzoylamino)-1-[4-(3-chlorophenyl-carbamoyl)-benzoylamino]-anthraquinone. | Red. |
| 348 | 4-(4-chloro-benzoylamino)-1-[3-(4-chlorophenyl-carbamoyl)-benzoylamino]-anthraquinone. | Red. |
| 349 | 4-(3-trifluoromethyl-benzoylamino)-1-(4-phenyl-carbamoyl-benzoylamino)-anthraquinone. | Red. |
| 350 | 4-(3-trifluoromethyl-benzoylamino)-1-[4-(4-chloro-phenylcarbamoyl)-benzoylamino]-anthraquinone. | Red. |
| 351 | 4-(4-nitro-benzoylamino)-1-[4-(2-chlorophenylcarbamoyl)-benzoylamino]-anthraquinine. | Red. |
| 352 | 4-(4-nitro-benzoylamino)-1-(4-phenylcarbamoyl-benzoylamino)-anthraquinone. | Red. |
| 353 | 1,4-di-(4-phenylcarbamoyl-benzoylamino)-anthraquinone. | Bluish red. |
| 354 | 1,4-di-[4-(2,3-dichloro-phenylcarbamoyl)-benzoylamino]-anthraquinone. | Do. |
| 355 | 1,4-di-[4-(2,5-dichloro-phenylcarbamoyl)-benzoylamino]-anthraquinone. | Violet. |
| 356 | 1,4-di-[4-(4-methyl-phenylcarbamoyl)-benzoylamino]-anthraquinone. | Bluish red. |
| 357 | 1,4-di-(4-phenylcarbamoyl-benzoylamino)-anthraquinone-2-carboxylic acid ethyl ester. | Red. |
| 358 | 1,4-di-[4-(4-chloro-phenylcarbamoyl)-benzoylamino]-anthraquinone-2-carboxylic acid butyl ester. | Red. |
| 359 | 1,8-di-[4-(4-sulphamoyl-phenylcarbamoyl)-benzoylamino]-anthraquinone. | Yellow. |
| 360 | 1,8-di-(2,3,5,6-tetrachloro-4-methylcarbamoyl-benzoylamino)-anthraquinone. | Do. |
| 361 | 1,8-di-(2,3,5,6-tetrafluoro-4-phenylcarbamoyl-benzoylamino)-anthraquinone. | Do. |
| 362 | 1,8-di-[4-(2-nitro-4-carbamoyl-phenylcarbamoyl)-naphtholy-(1)-amino]-anthraquinone. | Do. |
| 363 | 1,5-dihydroxy-4,8-di-(4-methylcarbamoylbenzoyl-amino)-anthraquinone. | Blue. |
| 364 | 1,5-dihydroxy-4,8-di-[4-(n-butylcarbamoyl)-benzoylamino]-anthraquinone. | Do. |
| 365 | 1,5-dihydroxy-4',8-di-[4-(4-sulphamoylphenyl-carbamoyl)-benzoylamino]-anthraquinone. | Do. |
| 366 | 1,5-dihydroxy-4,8-di-[4-(2,4-dicarbamoylphenylcar-bamoyl)-benzoylamino]-anthraquinone. | Do. |
| 367 | 1,5-dihydroxy-4,8-di-(4-phenylcarbamoylbenzoyl-amino)-anthraquinone. | Do. |

EXAMPLES 368–391

When a pigmented paper is produced according to Example 17 with the use of one of the dyestuffs stated in the Table, or when paper is printed with a printing paste containing a fine paste prepared according to Example 5 with the use of the dyestuffs stated below as well as water-soluble or hydrolysable binding agents, and when the paper thus pigmented or printed is treated according to Example 18, then fast laminated papers of the specified shades are obtained.

| Ex. | Dyestuff | Shade |
|---|---|---|
| 368 | 4-(4-chloro-benzoylamino)-1-(4-methylcarbamoyl-benzoylamino)-anthraquinone. | Red-violet. |
| 369 | 4-(4-chloro-benzoylamino)-1-[4-(4-nitrophenylcarbamoyl)-benzoylamino]-anthraquinone. | Red. |
| 370 | 4-benzoylamino-1-[4-(n-butyl-carbamoyl)-benzoylamino]-anthraquinone. | Bordeaux. |
| 371 | 4-benzoylamino-1-(4-phenylcarbamoyl-benzoylamino)-anthraquinone. | Red. |
| 372 | 4-benzoylamino-1-[4-(2-chloro-phenylcarbamoyl)-benzoylamino]-anthraquinone. | Red. |
| 373 | 4-benzoylamino-1-[4-(4-nitro-phenylcarbamoyl)-benzoylamino]-anthraquinone. | Red. |
| 374 | 4-(3-trifluoromethyl-benzoylamino)-1-(4-butyl-carbamoyl-benzoylamino)-anthraquinone. | Red. |
| 375 | 4-(4-nitro-benzoylamino)-1-[4-(4-chlorophenylcarbamoyl)-benzoylamino]-anthraquinone. | Red. |
| 376 | 2-bromo-1-[4-(4-chloro-phenylcarbamoyl)-benzoylamino]-4-(4-methyl-benzenesulphamido)-anthraquinone. | Red. |
| 377 | 1,4-di-[4-(2,3-dichloro-phenylcarbamoyl)-benzoylamino]-anthraquinone. | Bluish red. |
| 378 | 1,4-di-[4-(2,5-dichloro-phenylcarbamoyl)-benzoylamino]-anthraquinone. | Violet. |
| 379 | 1,4-di-[4-(2-chloro-5-trifluoromethyl-phenylcarbamoyl)-benzoylamino]-anthraquinone. | Bluish red. |
| 380 | 1,4-di-[4-(3-sulphamoyl-phenylcarbamoyl)-benzoylamino]-anthraquinone. | Red. |
| 381 | 1,4-di-[4-(4-carbamoyl-phenylcarbamoyl)-benzoylamino]-anthraquinone. | Bluish red. |
| 382 | 5,8-dichloro-1,4-di-[4-(n-butylcarbamoyl)-benzoylamino]-anthraquinone. | Red. |
| 383 | 1,5-(4-phenylcarbamoyl-benzoylamino)-anthraquinone. | Yellow. |
| 384 | 1,5-di-[4-(4-sulphamoyl-phenylcarbamoyl)-benzoylamino]-anthraquinone. | Do. |
| 385 | 1,5-di-[4-(4-carbamoyl-phenylcarbamoyl)-benzoylamino]-anthraquinone. | Do. |
| 386 | 1,5-di-[4-(2,5-dichloro-phenylcarbamoyl)-benzoylamino]-anthraquinone. | Do. |
| 387 | 1,5-dihydroxy-4,8-di-[4-(2,5-dichlorophenylcarbamoyl)-benzoylamino]-anthraquinone. | Blue. |
| 388 | 1,5-dihydroxy-4,8-di-[4-(4-methoxy-phenylcarbamoyl)-benzoylamino]-anthraquinone. | Do. |
| 389 | 1,5-dihydroxy-4,8-di-[4-(4-methyl-phenylcarbamoyl)-benzoylamino]-anthraquinone. | Do. |
| 390 | 1,5-dihydroxy-2-(4-methoxy-phenyl)-4,8-di-(4-butylcarbamoyl-benzoylamino)-anthraquinone. | Do. |
| 391 | 1,5-dihydroxy-3-(4-hydroxy-phenyl)-4,8-di-(4-phenylcarbamoyl-benzoylamino)-anthraquinone. | Do. |

EXAMPLES 392–404

Printing pastes prepared according to Example 13, but using corresponding amounts of the dyestuffs stated in the Table, yield fast offset prints in the specified shades.

| Ex. | Dyestuff | Shade |
|---|---|---|
| 392 | 1,5-dihydroxy-4,8-di-(5-methylcarbamoylnaphthoyl-(1)-amino)-anthraquinone. | Blue. |
| 393 | 1,5-dihydroxy-4,8-di-[4-(5-chloro-2-cyanophenylcarbamoyl)-benzoylamino]-anthraquinone. | Do. |
| 394 | 1,5-dihydroxy-4,8-di-[4-(2,4-dicyano-phenylcarbamoyl)-benzoylamino]-anthraquinone. | Do. |
| 395 | 1,5-dihydroxy-4,8-di-[4-[2-chloro-5-(2-hydroxyethyl-sulphamoyl)-phenylcarbamoyl]-benzoylamino]-anthraquinone. | Do. |
| 396 | 1,5-dihydroxy-4,8-di-[4-(6-carbamoylnaphthyl-(2)-carbamoyl)-benzoylamino]-anthraquinone. | Do. |
| 397 | 1,5-dihydroxy-4,8-di-[4-(2-carbamoyl-4-sulphamoyl-phenylcarbamoyl)-benzoylamino]-anthraquinone. | Do. |
| 398 | 1,5-dihydroxy-4,8-di-[-(4-phenylazophenylcarbamoyl)-benzoylamino]-anthraquinone. | Do. |
| 399 | 1,5-dihydroxy-4,8-di-(4-pyridyl-(2)-carbamoyl-benzoylamino)-anthraquinone. | Do. |
| 400 | 1,5-dihydroxy-4,8-di-[4-($\gamma$-picolylcarbamoyl)-benzoylamino]-anthraquinone. | Do. |
| 401 | 1,5-dihydroxy-4,8-di-[4-(2-phenyl-benzotriazolyl-(5)-carbamoyl)-benzoylamino]-anthraquinone. | Do. |
| 402 | 1,5-dihydroxy-4,8-di-[4-(thiazolyl-(2)-carbamoyl-benzoylamino)-anthraquinone. | Do. |
| 403 | 1,5-dihydroxy-4,8-di-[4-(6-methoxy-benzothiazolyl-(2)-carbamoyl)-benzoylamino]-anthraquinone. | Do. |
| 404 | 1,5-dihydroxy-4,8-di-[4-(2-methyl-benzothiazolyl-(6)-carbamoyl)-benzoylamino]-anthraquinone. | Do. |

What is claimed is:

1. The dyestuff: 4 - (4-chloro-benzoylamino)-1-[4-(2-chloro-phenylcarbamoyl)-benzoylamino]-anthraquinone.

2. The dyestuff: 4 - (4-chloro-benzoylamino)-1-[4-(4-sulphamoyl - phenylcarbamoyl)-benzoylamino] - anthraquinone.

References Cited

UNITED STATES PATENTS

| 3,598,831 | 8/1971 | Pfister | 260—377 |
| 3,436,401 | 4/1969 | Pfister | 260—377 |
| 3,361,765 | 1/1968 | Weber | 260—377 |

FOREIGN PATENTS

| 1,098,130 | 1/1968 | Great Britain | 260—377 |
| 1487045 | 5/1967 | France | 260—377 |

LORRAINE A. WEINBERGER, Primary Examiner

E. J. SKELLY, Assistant Examiner

U.S. Cl. X.R.

106—23, 164, 193 P; 162—134; 260—37 P, 37 N, 39 P, 40 R, 40 TN, 41 C, 41.5 R, 143, 192, 207.1, 256.4 Q, 256.5 R, 272, 303, 308 R, 316, 327 R, 327 TH, 329.2, 347.2, 347.3, 377